United States Patent
Lahav et al.

(10) Patent No.: US 11,279,643 B2
(45) Date of Patent: Mar. 22, 2022

(54) METHOD FOR SEPARATION OF MAGNESIUM AND CALCIUM IONS FROM SALINE WATER, FOR IMPROVING THE QUALITY OF SOFT AND DESALINATED WATERS

(71) Applicant: TECHNION RESEARCH & DEVELOPMENT FOUNDATION LIMITED, Haifa (IL)

(72) Inventors: Ori Lahav, Givat Ela (IL); Liat Birnhack, Haifa (IL); Paz Nativ, Haifa (IL); Oded Nir, D.N. Upper Galilee (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 633 days.

(21) Appl. No.: 16/089,014

(22) PCT Filed: Mar. 30, 2017

(86) PCT No.: PCT/IL2017/050392
§ 371 (c)(1),
(2) Date: Sep. 27, 2018

(87) PCT Pub. No.: WO2017/168425
PCT Pub. Date: Oct. 5, 2017

(65) Prior Publication Data
US 2020/0299165 A1 Sep. 24, 2020

(30) Foreign Application Priority Data
Mar. 31, 2016 (IL) .......................................... 244854

(51) Int. Cl.
*C02F 9/00* (2006.01)
*B01D 61/02* (2006.01)
(Continued)

(52) U.S. Cl.
CPC .............. *C02F 9/00* (2013.01); *B01D 61/022* (2013.01); *B01D 61/027* (2013.01);
(Continued)

(58) Field of Classification Search
CPC ........ B01D 2311/2623; B01D 2311/25; B01D 61/022; B01D 61/027; B01D 61/58;
(Continued)

(56) References Cited

U.S. PATENT DOCUMENTS

2008/0237110 A1 10/2008 Lightfoot
2010/0288700 A1 11/2010 Lahav
(Continued)

FOREIGN PATENT DOCUMENTS

CN 103253784 A 8/2013
WO 2010131251 A2 11/2010
(Continued)

OTHER PUBLICATIONS

The search report issued in CN20170033476.7, 10 pages. (Year: 2017).*

(Continued)

*Primary Examiner* — Terry K Cecil
(74) *Attorney, Agent, or Firm* — J.A. Lindeman & Co., PLLC

(57) ABSTRACT

Provided is a novel Nanofiltration-DiaNanofiltration (NF-DiaNF) system and method for extracting divalent ions from saline water (e.g., seawater) to produce solutions rich in divalent ions (in particular Mg2+, Ca2+ and SO42−), while minimizing the concentrations of undesirable species (e.g., Cl−, Br−, B and Na+). The solutions may be added to water (e.g., desalinated, soft, drinking or irrigation water) to enrich the water with divalent ions, thereby improving its quality.

19 Claims, 20 Drawing Sheets

(51) Int. Cl.
| | |
|---|---|
| B01D 61/14 | (2006.01) |
| B01D 61/58 | (2006.01) |
| C02F 1/42 | (2006.01) |
| C02F 1/44 | (2006.01) |
| C02F 101/10 | (2006.01) |
| C02F 103/08 | (2006.01) |

(52) U.S. Cl.
CPC ........... B01D 61/145 (2013.01); B01D 61/58 (2013.01); *B01D 2311/06* (2013.01); *B01D 2311/25* (2013.01); *B01D 2311/2623* (2013.01); *C02F 1/42* (2013.01); *C02F 1/441* (2013.01); *C02F 1/442* (2013.01); *C02F 1/444* (2013.01); *C02F 2001/422* (2013.01); *C02F 2001/425* (2013.01); *C02F 2101/101* (2013.01); *C02F 2103/08* (2013.01); *C02F 2301/046* (2013.01); *C02F 2301/08* (2013.01); *C02F 2303/22* (2013.01)

(58) Field of Classification Search
CPC ............ B01D 61/145; B01D 2317/022; B01D 2315/16; B01D 2311/06; B01D 65/08; C02F 1/442; C02F 1/20; C02F 2103/08; C02F 2103/10; C02F 2001/422; C02F 2001/425; C02F 2303/22; C02F 1/42; C02F 1/441; C02F 1/444; C02F 2101/101; C02F 2301/046; C02F 2301/08; C02F 2303/16; C02F 9/00
See application file for complete search history.

(56) References Cited

U.S. PATENT DOCUMENTS

| | | | |
|---|---|---|---|
| 2014/0202957 A1* | 7/2014 | Tao | C02F 5/06 210/638 |
| 2014/0299546 A1 | 10/2014 | Eckert | |

FOREIGN PATENT DOCUMENTS

| | | |
|---|---|---|
| WO | 2012077610 A1 | 6/2012 |
| WO | 2013030185 A1 | 3/2013 |
| WO | 2014193289 A1 | 12/2014 |

OTHER PUBLICATIONS

EPO Search report issued in Application No. 1773443.1, dated Aug. 21, 2019, 6 pages . (Year: 2019).*
Tanistra and Bodzek (1998) Preparation of high-purity sulphate lignin from spent black liquor using ultrafiltration and diafiltration processes. Desalination 115(2): 111-120.
Anne et al., (2001) Nanofiltration of seawater: fractionation of mono- and multi-valent cations. Desalination 140(1): 37-77.
Birnhack et al., (2007) A new post-treatment process for attaining Ca2+, Mg2+, SO42- and alkalinity criteria in desalinated water. Water Res 41(17):3989-3997.
Birnhack et al., (2010) Development of an additional step to current CO2-based CaCO3(s) dissolution post-treatment processes for cost-effective Mg2+ supply to desalinated water. Chemical Engineering Journal 160(1): 48-56.
Birnhack et al., (2010) Pilot scale evaluation of a novel post-treatment process for desalinated water. Desalination and Water Treatment 13(1-3): 128-136.
Birnhack et al., (2012) Potential applications of quarry dolomite for post treatment of desalinated water. Desalination and Water Treatment 1(1-3): 58-67.
Birnhack et al., (2014) Establishment of the Underlying Rationale and Description of a Cheap Nanofiltration-Based Method for Supplementing Desalinated Water with Magnesium Ions. Water 6(5): 1172-1186.
Durham et al., (2003) Nanofiltration for recovery of spent ion exchange brines. IMSTEC '03: 5th International Membrane Science and Technology Conference, Nov. 10-14, 2003, the University of New South Wales, Sydney, Australia. 6 pages.
Dutre et al., (1994) Macrosolute-microsolute separation by ultrafiltration: A review of diafiltration processes and applications. Desalination 95(3): 227-267.
Greenlee et al., (2009) Reverse osmosis desalination: water sources, technology, and today's challenges. Water Research 43(9): 2317-2348.
Hasson et al., (2013) Simple process for hardening desalinated water with Mg2+ ions. Desalination and Water Treatment 51(4-6): 924-929.
Lahav et al., (2007) Quality criteria for desalinated water following post-treatment. Desalination 207(1-3): 286-303.
Lehmann et al., (2014) Recovery of high-purity magnesium solutions from RO brines by adsorption of Mg(OH)2(s) on Fe3O4 micro-particles and magnetic solids separation. Chemical Engineering Journal vol. 235: 37-45.
Lehmann et al., (2016) Replenishing Mg(II) to desalinated water by seawater nanofiltration followed by magnetic separation of Mg(OH)2(s) Fe3O4 particles. Desalination and Water Treatment 57(42): 19903-19916.
Nativ et al., (2016) DiaNanofiltration-based method for inexpensive and selective separation of Mg2+ and Ca2+ ions from seawater, for improving the quality of soft and desalinated waters. Separation and Purification Technology 166: 83-91.
Ophek et al., (2015) Reducing the specific energy consumption of 1st-pass SWRO by application of high-flux membranes fed with high-pH, decarbonated seawater. Water Res 85: 185-192.
Redondo et al., (2003) Boron removal from seawater using FILMTECTM high rejection SWRO membranes. Desalination 156(1-3):229-238.
Reig et al., (2016) Integration of nanofiltration and bipolar electrodialysis for valorization of seawater desalination brines: Production of drinking and waste water treatment chemicals. Desalination 382: 13-20.
Tang et al., (2016) Highly-selective separation of divalent ions from seawater and seawater RO retentate. Separation and Purification Technology 175: 460-468.
Yermiyahu et al., (2007) Environmental science. Rethinking desalinated water quality and agriculture. Science 318 (5852): 920-921.
Oren et al., (2012) A different approach for brackish-water desalination, comprising acidification of the feed-water and CO2(aq) reuse for alkalinity, Ca2+ and Mg2+ supply in the post treatment stage. Separation and Purification Technology 89: 252-260.
Kovács Z. (2014) Batch Diafiltration. In: Drioli E., Giorno L. (eds) Encyclopedia of Membranes. Springer, Berlin, Heidelberg. https://doi.org/10.1007/978-3-642-40872-4_45-6. First Online: Dec. 7, 2015. Retrieved from: https://link.springer.com/referenceworkentry/10.1007%2F978-3-642-40872-4_45-6, on Sep. 1, 2021. 3 pages.

* cited by examiner

METHOD FOR SEPARATION OF MAGNESIUM AND CALCIUM IONS FROM SALINE WATER, FOR IMPROVING THE QUALITY OF SOFT AND DESALINATED WATERS

FIELD OF THE INVENTION

The present invention provides a novel Nanofiltration-DiaNanofiltration (NF-DiaNF) system and method for extracting divalent ions from saline water (e.g., seawater) to produce solutions rich in divalent ions (in particular $Mg^{2+}$, $Ca^{2+}$ and $SO_4^{2-}$), while minimizing the concentrations of undesirable species (e.g., $Cl^-$, $Br^-$, B and $Na^+$). The solutions may be added to water (e.g., desalinated, soft, drinking or irrigation water) to enrich the water with divalent ions, thereby improving its quality.

BACKGROUND OF THE INVENTION

Desalinated seawater (SW) is a rising potable and agricultural water source in which the $Mg^{2+}$ concentration tends towards zero. Other types of soft waters can be found in many parts of the world. The need for maintaining a minimal $Mg^{2+}$ concentration in drinking water is gaining momentum [1]. Magnesium plays hundreds of crucial roles in the body, including suppressing unstable heart rhythms, controlling blood pressure, maintaining insulin sensitivity, and regulating over 300 enzymes. Attaining optimal magnesium levels in drinking water is an absolute requirement for good health. In addition, need for $Mg^{2+}$ in irrigation water is unambiguous [2].

On the other hand, in places where the desalinated water is intended also for agricultural irrigation (either directly or as treated wastewater) restrictions have been set also on the $Cl^-$, $Na^+$ and boron concentrations in the product water [3], [4]. A post treatment (PT) step is invariably practiced in desalination plants in order to meet quality criteria regulations (or bid requirements), set for ensuring the stability of the water within the distribution system, its palatability, addition of minerals required from the public health perspective and the suitability of the water for irrigation of agricultural crops and municipal gardening plants [5]. Currently practiced PT processes add to the water only $Ca^{2+}$ and carbonate ions, and require adjustment of the pH value to attain a certain (positive) calcium carbonate precipitation potential (CCPP) or other corrosion-related indices (Langeleir Saturation Index or derivatives thereof).

Acknowledging that adding $Mg^{2+}$ ions through dissolution of food-grade chemicals ($MgCl_2$, $MgSO_4$, etc.) is expensive, development of a cheap method for enriching desalinated water with $Mg^{2+}$ ions while at the same time ensuring minimal addition of unwanted components (namely $Na^+$, $Cl^-$, and B), is consequential.

Several methods have been developed for enriching soft waters with $Mg^{2+}$: (1) Dissolution of magnesia (MgO) in packed bed reactors [6]; (2) Dissolution of dolomite ($CaMg(CO_3)_2$) and calcite in series [7]; (3) Elevation of the $Mg^{2+}$ concentration in desalinated water at the expense of $Ca^{2+}$ ions using a specific ion-exchange (IX) resin, previously loaded with $Mg^{2+}$ originating from SW [8]-[10]; (4) Dosage of seawater nanofiltration (NF) brine, rich in $Mg^{2+}$, into the desalinated water product [1]; (5) Extracting relatively pure $Mg^{2+}$ from seawater reverse osmosis (SWRO) brines by precipitating $Mg(OH)_{2(s)}$ on the surface of magnetite particles and re-dissolving it to produce a $Mg^{2+}$ rich solution [11]; and (6), Combining the NF process (#4 above) with the magnetite-based process (#5 above) [12].

Lehmann [12] reviewed these processes and teaches, among other things, that applying seawater NF (Method #4, [1]), results in $Mg^{2+}$ to $Cl^-$ concentration ratio in the produced brine that is much higher than the original ratio in seawater; it also shows that this brine solution could be produced at a very low cost. Nevertheless, despite the relatively high $Mg^{2+}$ to $Cl^-$ ratio, an inherent byproduct of applying this method is the addition of ~3.5 mg/l of $Cl^-$ to the desalinated product water for each mg/l of $Mg^{2+}$ added to it. Therefore, the process cannot be implemented where strict limitations are imposed on the addition of chlorides (e.g., Israel). In fact, none of the processes developed thus far is capable of enriching soft (desalinated) waters with 20 mgMg/l or more, without a significant addition of unwanted ions (mainly $Cl^-$ and B) at a cost that is lower than ~1 cent per $m^3$ of product water [12].

WO 2010/131251 to some of the inventors of the present invention discloses methods for separation of $Mg^{2+}$ ions from sea and brackish water for the purpose of remineralization of water and wastewater. The system includes a DU (desalination unit); a separation unit (SU) providing divalent ions enriched brine, and monovalent ions enriched permeate, which is configured to split salty water between DU and SU, add permeate to DU, and add brine to desalinated water from DU.

US 2010/0288700 to some of the inventors of the present invention discloses a calcite dissolution post-treatment process and apparatus for desalinated water. The process comprises separating cations from seawater or brackish/seawater desalination brines by ion exchange resin(s) onto which the ions are loaded, contacting the ion exchange resin(s) loaded with the cations with an effluent of a calcite dissolution reactor wherein the cations are exchanged with $Ca^{2+}$ from this effluent. The $Ca^{2+}$ concentration of the resulting desalinated water decreases while the cations concentration increases to comply with required quality criteria.

There is an unmet need for economical and reliable techniques for generation of brine containing high $Mg^{2+}$ concentration (along with proportional $Ca^{2+}$ and $SO_4^{2-}$ concentrations) which can be used to enrich the product water of a desalination plant or natural soft waters, with $Mg^{2+}$ ions while at the same time adding a very low concentration of unwanted species (e.g., $Cl^-$, $Br^-$, B and $Na^+$).

SUMMARY OF THE INVENTION

The present invention provides a novel combined Nanofiltration-DiaNanofiltration (DiaNF) system and method for extracting divalent ions from saline water (e.g., seawater) to produce solutions rich in divalent ions (particularly $Mg^{2+}$, $Ca^{2+}$ and $SO_4^{2-}$), while minimizing the concentrations of undesirable species (e.g., $Cl^-$, $Br^-$, B and $Na^+$). The solutions may be added to water (e.g., desalinated, soft, drinking or irrigation water) to enrich the water with divalent ions, thereby improving its quality.

The present invention relates to a seawater-nanofiltration-based process for replenishing $Mg^{2+}$ (and also $Ca^{2+}$ and $SO_4^{2-}$) to desalinated and soft waters intended for use, e.g., for drinking and irrigation purposes. The process complies with the requirements mentioned above, i.e., minimal addition of unwanted ions ($Cl^{-1}$, $Br^-$, B and $Na^+$) and relatively low cost, and is characterized by ease of operation and robustness. The present invention is based on a method termed "diaFiltration" which is carried out in the present invention with a nanofiltration (NF) membrane (the process is designated herein "DiaNanofiltration" or "DiaNF"). DiaFiltration is a known procedure [13], which is practiced at full scale with a wide variety of membranes and sieves, for example for separating and purifying dairy solutions [13]. DiaFiltration involves dosage of low-total dissolved solids (TDS) water to the feed of the filtration process to improve the "wash out" of unwanted components and species that permeate preferably through the membrane. When applying diafiltration with an NF membrane on seawater, the species that are washed-out (i.e. which pass the membrane to the permeate side) are mainly mono-valent ions and uncharged species (e.g. boron species such as boric acid; $B(OH)_3$), while the multi-valent ions (namely $SO_4^{2-}$, $Ca^{2+}$ and $Mg^{2+}$ in SW), which are rejected better by the NF membrane, accumulate in the brine.

The process of the present invention relies on a conventional seawater NF step followed by at least one DiaNF cycle on the brine produced in the NF step. The main purpose of the NF step is to reduce the total volume of the water that will undergo DiaNF. In this way, the volume of the costly diluting solution (the low-TDS solution) to be fed to the DiaNF step is reduced, thus offering significant cost savings. Since the NF membrane preferentially rejects divalent ions but passes monovalent ions, the resulting brine of the NF step has a higher concentration of divalent ions ($SO_4^{2-}$, $Ca^{2+}$ and $Mg^{2+}$) and a similar (or just slightly higher) concentration of monovalent ions and other species present in seawater (e.g., $Cl^-$, $Br^-$, B, $Na^+$ etc.), as compared with the source water. The purpose of the DiaNF step is to reduce the concentration of the unwanted species ($Cl^-$, $Br^-$, B, $Na^+$ etc.) in the brine produced from this step. Since the volume of water undergoing the DiaNF cycle does not change (since the diluting water is added at a flow rate similar to that of the permeate leaving the system), the concentration of divalent ions remains relatively constant, while the unwanted species are "washed out".

Another purpose of the NF step is to reduce the $Mg^{2+}$+ $Ca^{2+}$: $SO_4^{2-}$ concentration ratio from ~2:1 (i.e., the ratio present in seawater), preferably down to between about 1.25:1, to about 1:1, so as to reduce or eliminate $Cl^-$ in the product water, as further described hereinbelow.

The brine produced by the NF step can be applied both for hardening soft waters (close to the shore) and desalinated water. Several alternative processes representing alternative embodiments of the present invention were developed and tested for implementing the NF-DiaNF concept for recovering $Mg^{2+}$, $Ca^{2+}$ and $SO_4^{2-}$ from both seawater (SW) and seawater reverse osmosis (SWRO) brine, the latter specific for improving the quality of water produced in seawater RO plants. The process of the invention attains a maximal ratio between the $Mg^{2+}$ (and $Ca^{2+}$) added to the product water and the unwanted constituents (namely B, $Br^-$, $Na^+$ and $Cl^-$). The concept of the present invention is efficient, robust and cost-competitive.

Thus, in some embodiments, the present invention provides a process for treating saline water to obtain product water comprising a higher concentration of divalent ions selected from $Mg^{2+}$, $Ca^{2+}$ and $SO_4^{2-}$ as compared with the saline water. The process comprises the steps of (a) passing a sample of saline water through a first nanofiltration (NF) membrane to obtain an NF permeate and an NF retentate (NF brine); (b) passing the NF brine obtained in step (a) through a second NF membrane in the presence of a diluting solution (diaNanofiltration (DiaNF) mode), to obtain a diaNF permeate and a diaNF retentate (DiaNF brine); (c) optionally subjecting the diaNF brine obtained in step (b) to one or more additional DiaNF cycles in the presence of a diluting solution; and (d) isolating the DiaNF brine from step (b) or optional step (c) as product water having a higher concentration of the aforementioned divalent ions, and a lower concentration of species selected from $Na^+$, $Br^-$, $Cl^-$ and B as compared with the starting saline water.

In other embodiments, the process may start with a DiaNF dilution cycle (or multiple cycles) followed by an NF step (or multiple NF steps), and further one or more DiaNF cycles.

In other embodiments, the process may start with multiple NF steps, followed by DiaNF dilution cycle (or multiple cycles) followed optionally by additional NF and/or diaNF cycles.

In some embodiments, the process further comprises the step of passing the product water through at least one ultrafiltration (UF) membrane with the purpose of removing microorganisms from it prior to dosing the brine to drinking water, and/or for removing anti-scalant (AS), as further defined below.

In other embodiments, the saline water is de-carbonated prior to the NF step (a) so as to prevent precipitation of $CaCO_3$ or other sparingly soluble carbonate salts on the membranes during the NF and DiaNF steps.

Any type of saline water may be treated in accordance with the process of the present invention. Examples of water that may be treated is seawater, brackish water and seawater reverse osmosis (SWRO) brine. Each possibility represents a separate embodiment of the present invention.

The diluting solution used for the DiaNF step(s) may vary, depending on the stage of the process (e.g., first or last few cycles), as well as the quality of the water undergoing treatment and the quality requirements of the product water. In some embodiments, the diluting solution is selected from low total dissolved solids (TDS) water, soft water, distilled water, tap water, NF permeate, SWRO permeate, and brine obtained after multiple SWRO stages. Each possibility represents a separate embodiment of the present invention.

The recovery ratio (RR) of) of the NF step (a) is typically between 40% and 85%, or any number in-between. Each possibility represents a separate embodiment of the present invention.

In some embodiments, an anti-scalant (AS) may be added to the saline water prior to or during treatment, in order to prevent deposition of sparingly soluble chemicals (e.g., calcium carbonate, barium sulfate or calcium sulfate) on the membranes. When used, the UF membrane mentioned above may be chosen such that it will reject the anti-scalant, thereby removing such anti-scalant from the product water.

The process of the invention can conveniently be performed using a single DiaNF cycle, or multiple cycles, depending on the needs of the product water. Each possibility represents a separate embodiment of the present invention. In some embodiments, the process includes between about 1 and about 10 DiaNF cycles, preferably between about 1 and about 6 DiaNF cycles. In the case of multiple DiaNF cycles, the process of the invention may use the permeates of the last few cycles, as diluting solution for the first few DiaNF cycles of the next batch of saline water. The permeates resulting from the first few DiaNF cycles typically have high concentrations of monovalent ions ($Na^+$, $Cl^-$, etc.) and other species (e.g., B) and are therefore discarded. However, the next few permeates are low in these species, and therefore may be used as diluting solutions for the initial DiaNF steps of the next batch of saline water. The advantage of this embodiment is a significant cost savings since only a fraction of external (and costly) diluting solution is needed. This embodiment of the present invention is designated herein "counter-current", and a working example is depicted in FIG. 2.

Furthermore, the diluting solution of the last DiaNF cycle (or last few cycles) may be produced water, such as SWRO permeate (front or rear) before being subjected to the post treatment (remineralization) stage in the desalination plant. In other embodiments, the dilution solution of the last DiaNF cycle(s) may be distilled water or any available fresh water. Similarly, the diluting solution of the first DiaNF cycle may be brine obtained after multiple SWRO stages.

The process of the invention can be performed using a single NF cycle, or multiple NF cycles, depending on the needs of the product water. Each possibility represents a separate embodiment of the present invention. In some embodiments, the process includes between about 1 and about 10 NF cycles, preferably between about 1 and about 6 NF cycles.

The process of the present invention typically uses a single NF membrane for the NF step, and a separate NF membrane for the DiaNF step (although multiple membranes may be used if desired for multiple NF/DiaNF cycles). Thus, in some embodiments, the process of the invention comprises at least one NF cycle and at least one dia-NF cycle. In other embodiments, the process of the invention comprises multiple NF cycles and multiple diaNF cycles which can occur in any order. The NF and DiaNF cycle(s) may use the same type of NF membrane or different types of NF membranes, with each possibility representing a separate embodiment of the present invention. In some embodiments, the NF membrane is selected from the group consisting of NP030, Desal-5 DL, Desal-5 DK, Desal HL, NF 270, NF 245, NF90, NE40, NE70, Alfa-Laval NF, AlfaLaval NF 10, Alfa-Laval NF 20, TriSep TS40, Trisep TS80, Hydranautics 84200 ESNA 3J, NP010P and 2540-UA60-TSF. Each possibility represents a separate embodiment of the present invention. As noted above, the NF membrane preferentially rejects $SO_4^{2-}$, $Ca^{+2}$ and/or $Mg^{2+}$ ions over unwanted species ($Na^+$, $Br^-$, $Cl^-$ and B) and therefore the NF and DiaNF steps together result in the generation of product water that is high in divalent ions and low in the undesired species.

In some embodiments, the permeate streams from the NF and DiaNF cycle(s) are combined and recycled, e.g., back to a desalination plant.

In seawater, the concentration of $SO_4^{2-}$ (~60 meq/l), is much lower than the sum of concentrations of $Ca^{2+}$, $Sr^{2+}$ and $Mg^{2+}$ also known as "Total Hardness" or "TH" (~120 meq/l) (i.e., a ratio of approximately 1:2). In order to preserve electroneutrality, the rejection of chloride tends to increase as the NF-DiaNF process progresses, resulting in considerable chloride concentration in the produced $Mg^{2+}$ rich brine. Some countries, like Israel, impose strict restrictions on chloride concentration in drinking water and particularly in desalinated water, and accordingly it may be desired to reduce the gap between divalent and anions and cations, preferably to 1:1. Once this is achieved, chloride and other monovalent anions may be removed completely or almost completely. Therefore, in some embodiments, the present invention further comprises the step of lowering the $Mg^{2+}+Ca^{2+}:SO_4^{2-}$ concentration ratio in the product water as compared with the saline water, preferably to achieve a ratio of about 1:1 (in eq. to eq. units). Lowering the $Mg^{2+}+Ca^{2+}:SO_4$ concentration ratio may either be achieved by reducing the $Mg^{2+}$ and $Ca^{2+}$ concentrations, or by increasing the $SO_4^{2-}$ concentration, or both. There are various ways to achieve these goals.

In some embodiments, lowering the $Mg^{2+}+Ca^{2+}:SO_4$ concentration ratio is achieved by lowering the $Mg^{2+}$ and $Ca^{2+}$ concentrations. The $Mg^{2+}+Ca^{2+}:SO_4^{2-}$ concentration ratio may be lowered by performing a cation exchange step. The cation exchange step may be performed on the saline water prior to the NF step, between two NF cycles or between the NF and DiaNF cycles.

In some embodiments, lowering the $Mg^{2+}+Ca^{2+}:SO_4$ concentration ratio is achieved by increasing the $SO_4^{2-}$ concentration. In one embodiment, the $SO_4^{2-}$ concentration is increased by employing a membrane which preferentially rejects $SO_4^{2-}$ over $Mg^{2+}$ and $Ca^{2+}$, prior to NF step (a), or as part of the NF step (a). The membrane which preferentially rejects $SO_4^{2-}$ over $Mg^{2+}$ and $Ca^{2+}$ may be an open NF membrane or a closed UF membrane. One such membrane is NP030. In another embodiment, the $SO_4^{2-}$ concentration is increased by adding a $SO_4^{2-}$ source to the feed of the DiaNF step. In another embodiment, the $SO_4^{2-}$ concentration is increased by performing an anion exchange step between the NF and DiaNF cycles. Preferably, such manipulations result in a lowering of the $Mg^{2+}+Ca^{2+}:SO_4^{2-}$ concentration ratio from about 2:1 in the saline water to between about 1.25:1 and about 1:1 in the product water. As noted above, this will enable the process of the invention to reduce or almost eliminate $Cl^-$ ions in the product water.

Overall, the process of the present invention generally results in lowering the $Cl^-$ to $Mg^{2+}$ concentration ratio from at least about 10:1 (w/w), preferably at least about 15:1 (w/w) in the saline water, to lower than about 5:1 (w/w), preferably lower than about 1:1 (w/w) in the product water. In some embodiments employing the further lowering of the $Mg^{2+}+Ca^{2+}:SO_4^{2-}$ concentration ratio to about 1:1, the $Cl^-$ concentration in the product water is close to 0, i.e., the product water will be substantially devoid of $Cl^-$.

Similarly, the process of the invention generally results in lowering the $Na^+$ to $Mg^{2+}$ concentration ratio from at least about 5:1 (w/w), preferably at least about 7.5:1 (w/w) in the saline water, to about 1:1 (w/w) or lower in the product water. Preferably, the $Na^+$ concentration in the product water is close to 0, i.e., the product water will be substantially devoid of $Na^+$.

According to the principles of the present invention, the brine from the last DiaNF cycle (or optional UF cycle) is isolated as product water which is rich in divalent ions $Mg^{2+}$ and, $Ca^{2+}$, and/or $SO_4^{2-}$, and low in undesired species that are present in seawater ($Na^+$, $Br^-$, $Cl-$, B, etc.). This treated water is an excellent source to be added to desalinated or soft water so as to supplement such water with these minerals, thereby improving their quality. Thus, in some embodiments, the process of the present invention further comprises the step of adding the product water to a water sample so as to supplement said water sample with $Mg^{2+}$ and, $Ca^{2+}$, and/or $SO_4^{2-}$. The water to be supplemented may be any one or more of the following: desalinated water, soft water, drinking water or irrigation water.

In other aspects, the present invention further relates to a system for treating saline water to produce product water comprising a higher concentration of divalent ions selected from $Mg^{2+}$, $Ca^{2+}$ and $SO_4^{2-}$ as compared with the saline water, the system comprising: (a) at least one nanofiltration (NF) module, each module comprising a first NF membrane, an inlet for a feed stream, an outlet for a NF permeate stream and an outlet for a NF retentate (NF brine) stream; (b) at least one diaNanofiltration (DiaNF) module, each module comprising a second NF membrane, an inlet for the NF retentate stream obtained in step (a), an inlet for a diluting solution stream, an outlet for a DiaNF permeate stream and an outlet for a DiaNF retentate (DiaNF brine) stream; (c) optionally, an ultrafiltration (UF) module for reducing the concentration of microorganisms such as protozoa, bacteria and viruses and/or for removing anti-scalant, the module comprising an UF membrane, an inlet for the DiaNF brine stream obtained in step (b), an outlet for a UF product stream; and (d) a receiving tank for isolating the DiaNF brine obtained in step (b) or the UF product stream from an optional step (c), the brine/UF product stream being product water having a higher concentration of the divalent ions selected from $Mg^{2+}$, $Ca^{2+}$ and $SO_4^{2-}$, and a lower concentration of species selected from $Na^+$, $Br^-$, $Cl^-$ and B as compared with the saline water.

In some embodiments, the system further comprises a connector for recycling the diaNF brine obtained in step (b) for multiple cycles of DiaNF. As used herein, the term "multiple cycles" refers to the addition of multiple volumes of dilution solution in a continuous manner. In other embodiments, the system further comprises a connector for recycling the permeate from the last DiaNF cycle (or last few cycles) as the diluting solution of the first DiaNF cycle (or first few cycles) of the next batch of saline water.

In some embodiment, the system further comprises one or more additional nanofiltration (NF) modules comprising a nanofiltration (NF) membrane, an ultrafiltration (UF) membrane, or a combination thereof.

The system may further optionally comprise a cation exchange module comprising a cation exchange resin, or an anion exchange module comprising an anion exchange resin. Combinations of multiple ion exchange modules are also possible.

These aspects of the present invention, along with other considerations related to the process of the invention are exemplified in the detailed description hereinbelow on specific treatment paradigms according to local Israeli regulations, which imposes restrictions on B and $Na^+$ concentrations in water used for irrigation and drinking purposes. However, the principles of the present invention are described in a manner enabling the suggested treatment scheme to be easily adjusted to other discharge criteria and/or water characteristics.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention relates to a method for extracting $Mg^{2+}$ and $Ca^{2+}$ ions from seawater to produce a solution characterized by high concentrations of required ions (i.e. $Mg^{2+}$, $Ca^{2+}$ and $SO_4^{2-}$) along with minimal concentrations of unwanted species present in seawater or other saline water (i.e. $Cl^-$, $Br^-$, B and $Na^+$), to be dosed to soft waters. The method comprises nanofiltration (NF) of saline water (e.g., seawater (SW) or seawater reverse osmosis brines (SWRO)) followed by one or more DiaFiltration step(s) using a nanofiltration (NF) membrane. A Diafiltration process using an NF membrane is designated herein "DiaNanofiltration". DiaNanofiltration is a nanofiltration procedure that involves dosage of low-TDS water to the feed solution, to improve the "wash out" of unwanted components. As demonstrated herein, the $Cl^-$ to $Mg^{2+}$ concentration ratio in the solution produced by the process of the invention varies between 1.52 and 3.27 (w:w), depending on the of chosen operational alternative. In some embodiments exemplified herein, the $Cl^-$ concentration is reduced even further, to reach a product water that has no or minimal $Cl^-$ concentration. The solution produced by the process of the invention may be used to enrich desalinated or soft water with divalent ions (i.e., $Mg^{2+}$, $Ca^{2+}$ and $SO_4^{2-}$).

The term "soft water" as used herein refers to water that contains low concentrations of ions and in particular is low in ions of calcium ($Ca^{2+}$) and magnesium ($Mg^{2+}$). The term may also be used to describe water that has been produced by a water softening process. Calcium and magnesium ions are required for normal metabolism in many organisms including mammals. The lack of these ions in soft water have given rise to concerns about the possible health impacts of drinking soft water. The present invention provides a method for enriching soft water by adding a solution rich in $Ca^{2+}$ and $Mg^{2+}$ (as well as sulfate: $SO_4^{2-}$), such solution being prepared by the process described herein.

Process Description

Figure 1:
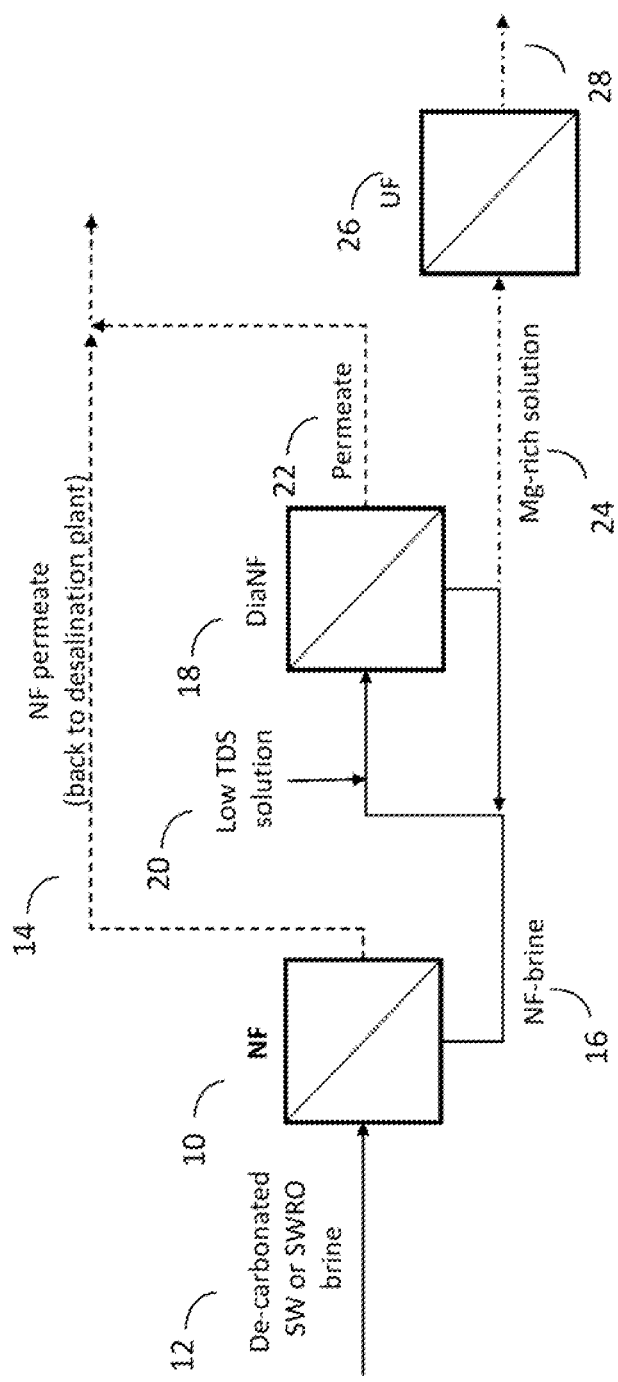
FIG. 1: is a schematic representation of a NF-DiaNF treatment scheme according to the present invention, for selective separation of $Ca^{2+}$ and $Mg^{2+}$ from sea water (SW) or SWRO brine. The number of DiaNF cycles applied determines the ratio between $Ca^{2+}/Mg^{2+}$ and the unwanted species ($Na^+$, $Cl^-$, B, etc.).

FIG. 1 is a schematic representation of a treatment scheme according to the present invention. The system includes a NF module comprising a NF membrane 10, an inlet for a feed stream 12 through which source water (e.g., SW, brackish water or SWRO brine) passes, an outlet for the NF permeate stream 14 and an outlet for the NF retentate (brine) stream 16. The system further includes a DiaNanofiltration (DiaNF) module comprising a NF membrane 18, to which the NF retentate stream 16, combined with a stream of low total dissolved solids (TDS) water 20, is fed. The NF membrane 18 in the DiaNF module comprises an outlet for the DiaNF permeate stream 22 and an outlet for the $Mg^{2+}$/$Ca^{2+}$ rich DiaNF retentate (brine) stream 24. The DiaNF brine 24 may be recycled back for one or more DiaNF cycles, by adding additional low TDS water 20 in a continuous manner. The DiaNF permeate stream 22 feeds into the NF permeate stream 14 to create a combined solution that is recycled back to the desalination plant. Optionally the $Mg^{2+}$/$Ca^{2+}$ rich DiaNF retentate 24 is passed through an ultrafiltration (UF) membrane 26 which serves to remove microorganisms such as protozoa, bacteria and viruses (and optionally to remove anti-scalant if desired), to obtain a product stream 28. The DiaNF brine 24 and/or the UF purified stream 28 thus obtained are highly rich in $Mg^{2+}$, $Ca^{2+}$ and $SO_4^{2-}$, and low in undesirable monovalent ions and other species (e.g., $Cl^-$, $Br^-$, B, $Na^+$ etc.), and are therefore suitable for use in the enrichment of soft water with these minerals, as described herein. The DiaNF brine of the last cycle (with or without UF purification) is collected and used as product water to supplement with divalent ions as described herein.

The source water (i.e., the $Mg^{2+}$ and $Ca^{2+}$ source) is seawater (SW), brackish water or seawater reverse osmosis (SWRO) brine, which preferably undergoes a pretreatment stage, comprising of acidification and de-carbonation, in order to circumvent $CaCO_3$ precipitation in the next steps. Optionally, an anti-scalant is added in order to prevent precipitation of solids (e.g. $BaSO_4$, $CaCO_3$, $CaSO_4$) on the membranes surface. The de-carbonated source water is then nanofiltered through the NF module 10, typically at a recovery ratio ranging from 40% to 85%. The recovery ratio is limited by the precipitation of gypsum ($CaSO_4 \cdot 2H_2O$), measured by the saturation index (SI) developing on the brine side, which is mainly a specific result of the $Ca^{2+}$ rejection of a given NF membrane (the rejection of $SO_4^{2-}$ by most NF membranes approaches 100%). Two main goals are achieved by first applying a conventional NF step: (a) elevation of the divalent ion concentrations in the brine while maintaining the concentrations of the monovalent ions approximately constant ([1]); and (b) decreasing the volume of the costly diluting solution (the low-TDS solution) to be fed to the DiaNF step, i.e., to the following separation step.

Once the brine of the NF step 16 has been produced, it is fed, together with diluting solution to the second NF membrane 18, and DiaNF operation is initiated. When the process is applied as a part of a PT process (post treatment, also designated "remineralization") in desalination plants, the "low TDS water" with which the feed of the DiaNF stage is diluted may be the $1^{st}$ SWRO permeate solution (either the front or the rear permeate or the final SWRO permeate stream prior to the remineralization step, can be used for this purpose). Alternatively, when the process is applied for enriching soft waters with $Mg^{2+}$ and $Ca^{2+}$, the diluting stream can be any available soft water. Each dilution cycle applied during the DiaNF sequence extracts a relatively large mass of monovalent ions and boron from the initial NF brine, along with a much lower mass of divalent ions, thereby improving the selectivity of the $Ca^{2+}$/$Mg^{2+}$ separation. As used herein, the term "front permeate" (which is typically the first 20%-30% of the permeate volume), is the permeate that is roughly generated in the first one or two membranes (e.g., out of a typical membrane chain of about 7 membrane modules) in a desalination plant and thus its salt and boron content is the lowest. The term "rear permeate" (which is typically the last 70%-80% of the permeate volume) means the permeate that is generated from the last five or six membranes of the aforementioned membrane train. The term "combined permeate" means the combined permeate coming out of the aforementioned membrane chain, which constitutes a mixture of the rear and front permeate.

The process of the invention can be conducted according to two main scenarios, differing in cost and final product quality: (1) a NF-DiaNF process with a single DiaNF cycle; and (2) a NF-DiaNF process with multiple (2 or more) repeating cycles (wherein multiple cycles refers to addition of multiple volumes of diluting solution in a continuous manner). A multi-cycle process achieves a purer $Mg^{2+}$/$Ca^{2+}$ solution, however it is associated with a higher cost, due mostly to the larger volume of the diluting water that is fed into the DiaNF process.

Furthermore, in some embodiments, the process may start with a DiaNF dilution cycle (or cycles), followed by an NF step, and followed by a DiaNF dilution cycle (or cycles). The process may also employ multiple NF cycles prior to the DiaNF step.

In one embodiment of the present invention, seawater may be used as the $Mg^{2+}$ source. In other embodiments, brackish water (instead of or in addition to seawater) may be used as the $Mg^{2+}$ source. In other embodiments, SWRO brine (instead of or in addition to seawater) may be used as the $Mg^{2+}$ source. This alternative, which is relevant to SWRO desalination plants, is based on using the $1^{st}$ stage reject brine of the SWRO plant (see composition in Table 1) as the $Mg^{2+}$ source. Since the $Mg^{2+}$ concentration in the SWRO brine is approximately twice the concentration in SW, it is contemplated that only one extra DiaNF cycle would be required for washing out the surplus unwanted ions. Hence, this embodiment is advantageous in that the cost of separating a given $Mg^{2+}/Ca^{2+}$ mass is significantly reduced.

In other aspects of the invention, the treatment paradigm includes a "counter current" NF-DiaNF process. This embodiment is based on DiaNF counter current application [13] which refers to a DiaNF process in which the diluting solution in the first cycle (or first few cycles) is the permeate solution of the NF steps of the final cycle (or final few cycles) of the previously treated volume. Thus, according to this embodiment, the permeate of the last DiaNF cycle (or last few cycles) for a given batch of saline water is recycled and used as the diluting solution of the first DiaNF cycle (of first few cycles) of the next batch of saline water. The permeate stream of the final DiaNF cycles is characterized by considerably lower TDS concentrations than the TDS in SW or in $1^{st}$ SWRO brine (which forms the feed to the first DiaNF cycle). In this operation scheme, the diluting solution of the last DiaNF cycles may be SWRO permeate (rear, front or combined), distilled water or fresh water.

Figure 2:
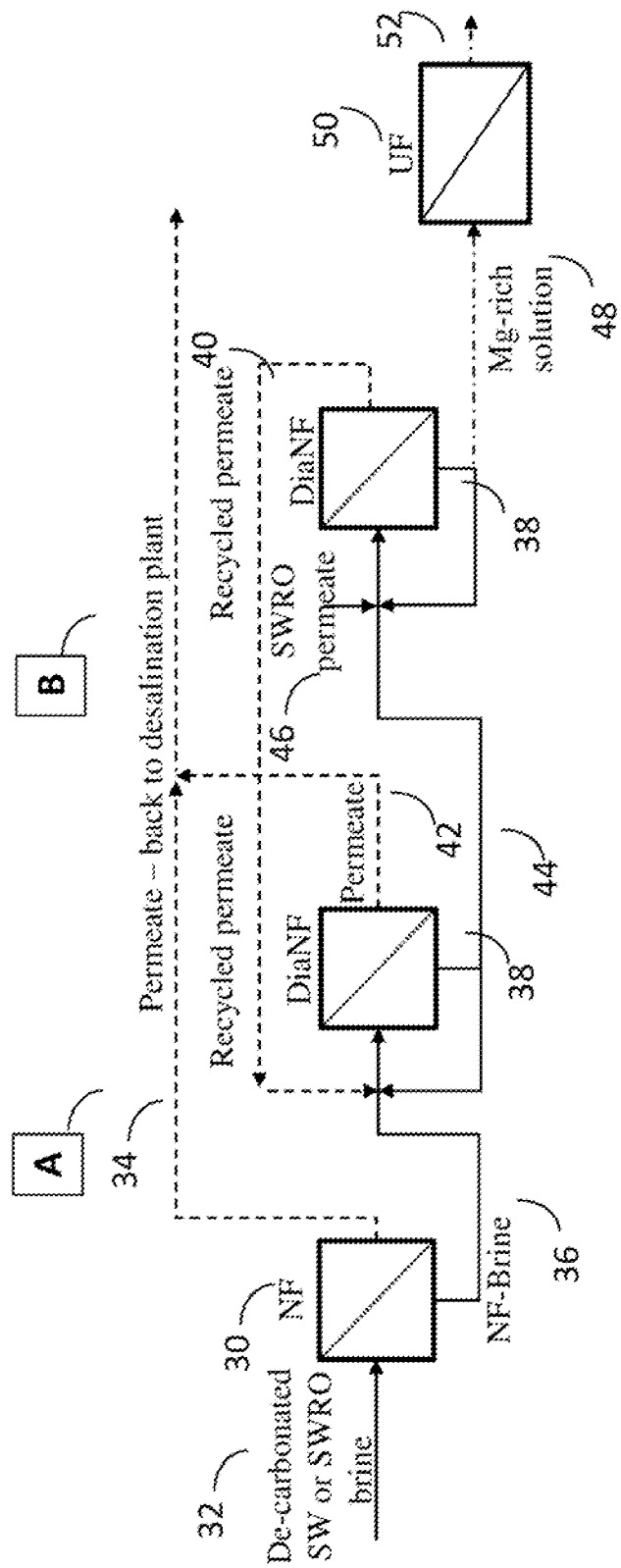
FIG. 2: is a schematic representation of a counter-current NF-DiaNF treatment scheme according to the present invention. It is noted the treatment scheme uses one NF membrane for the initial NF step, and a separate (or similar) NF membrane for the DiaNF step. The two DiaNF modules are drawn for only for illustration of the counter-current scheme of the present invention, however in practice one DiaNF module was used.

FIG. 2 is a schematic representation of a "counter current" treatment scheme according to the present invention. In FIG. 2, a conventional NF step is applied on SW or on $1^{st}$ stage SWRO brine and the permeate stream of the last DiaNF cycles is reused as diluting solution for the first cycles. It is noted the treatment scheme may use one NF membrane for the initial NF step, and a separate NF membrane for the DiaNF step. The two DiaNF modules are drawn for only for illustration of the counter-current scheme of the present invention, however in practice one DiaNF module was used.

The system includes a NF module comprising a NF membrane 30, an inlet for a feed stream 32 through which source water (SW, brackish water or SWRO brine) passes, an outlet for the NF permeate stream 34 and an outlet for the NF retentate (brine) stream 36. The system further includes a DiaNanofiltration (DiaNF) module comprising a NF membrane 38. In the first DiaNF cycle or first few cycles (depicted as "A" in FIG. 2), the NF brine stream 36 is fed into NF membrane 38, combined with the permeate stream of the last DiaNF cycle(s) 40 of the previous volume, which serves as the diluting solution for the first DiaNF cycle(s) of the current volume. The NF membrane 38 comprises an outlet for the DiaNF permeate stream 42 and an outlet for the $Mg^{2+}/Ca^{2+}$ rich DiaNF retentate (brine) stream 44. The DiaNF brine 44 undergoes addition cycles of DiaNF in a continuous manner, with the last DiaNF cycle (or last few cycles) depicted in the figure as "B". In the last cycle(s), the diluting solution 46 may be SWRO permeate, distilled water or fresh water. As detailed above, the NF permeate 40 coming out of the last DiaNF cycle(s) is fed back and serves as the diluting solution of the first DiaNF cycle(s) of the next volume of water, while the $Mg^{2+}/Ca^{2+}$ rich DiaNF retentate (brine) stream 48 is collected. Optionally the $Mg^{2+}/Ca^{2+}$ rich DiaNF retentate 48 is passed through an ultrafiltration (UF) membrane 50, to obtain a product stream 52. The DiaNF brine 48 and/or the UF purified stream 52 thus obtained are highly rich in $Mg^{2+}$, $Ca^{2+}$ and $SO_4^{2-}$, and low in undesirable monovalent ions and other species (e.g., $Cl^-$, $Br^-$, B, $Na^+$ etc.), and are therefore suitable for use in the enrichment of soft water with these minerals, as described herein. The NF permeates of the first steps of the DiaNF stages, which are not recycled as diluting solutions, may be combined and recycled back to the desalination plant, if desired.

As used herein, the term "DiaNF cycle" refers to a volume of dilution solution that is equal to the volume of the original NF brine undergoing a DiaNF step. When the process of the invention comprises multiple cycles of DiaNF, such cycles are continuously run by continuously feeding multiple volumes of diluting solutions as described herein. The term "multiple cycles of DiaNF" means a multiplicity of dilution volumes being used during the DiaNF cycles. Multiples can mean whole numbers of fractions thereof (e.g., 2.5 cycles, 4.5 cycles and the like). Reference to "first DiaNF" or "last DiaNF" as used herein does not necessarily mean only the first or only the last DiaNF cycle. According to the principles of the present invention, as long as the permeate from the last stages of DiaNF is low enough in TDS, it can be recycled as diluting solution for the first few steps of DiaNF of the next batch of water. Thus, reference to "first DiaNF cycle(s)" as used herein means either the first DiaNF stage only, or the first several DiaNF stages (e.g., the first 2, 3 or 4 DiaNF stages). Reference to "last DiaNF cycle(s)" as used herein means either the last DiaNF stage only, or the last several DiaNF stages (e.g., the last 2, 3 or 4 DiaNF stages).

Any type of diluting solution can be used as part of the DiaNF step. As mentioned above, the diluting water may be fresh water (e.g., tap water, distilled water, purified water etc.), or SWRO permeate. Other suitable diluting solution can be any source water that is slightly inferior to SWRO permeate in terms of composition, but is significantly less costly. In this way, the costs of the process are reduced significantly. To minimize impurities, such dilution solutions should be limited to the first dilution cycle(s). For example, the $4^{th}$ brine (see composition in Table 1) produced in some desalination plants (e.g. the Ashkelon plant in Israel, see [3]) and then discharged to the sea, can potentially be used. In order to avoid high boron concentrations in the produced $Mg^{2+}$ solution and to further lower the unwanted species concentrations, the diluting solution in the last washing cycles is preferably RO permeate. The implementation of this process scheme was embodied in the present invention as follows: SWRO brine was used as the $Mg^{2+}$ source; 2.45 dilution cycles (DiaNF) were applied with a solution simulating the $4^{th}$ stage brine from the Ashkelon plant; then, an NF step was applied on the treated brine to reach a RR of 60%; and finally, 2.1 dilution cycles (DiaNF) were applied with distilled water (simulating SWRO permeate) as the diluting solution.

TABLE 1

Composition of important species in the solutions used in the experiments

| Stream | $Ca^{2+}$ g/L | $Mg^{2+}$ g/L | $Na^+$ g/L | B mg/l | $Cl^-$ g/L | $Sr^{+2}$ mg/l | $Br^-$ mg/l | $SO_4^{-2}$ g/L |
|---|---|---|---|---|---|---|---|---|
| Mediterranean SW | 0.46 | 1.36 | 11.82 | 5.00 | 20.79 | 8.6 | 72.86 | 3.08 |
| $1^{st}$ stage SWRO brine | 0.80 | 2.40 | 20.68 | 8.09 | 35.55 | 13.84 | *124.58 | 6.06 |

TABLE 1-continued

Composition of important species in the solutions used in the experiments

| Stream | $Ca^{2+}$ g/L | $Mg^{2+}$ g/L | $Na^+$ g/L | B mg/l | $Cl^-$ g/L | $Sr^{+2}$ mg/l | $Br^-$ mg/l | $SO_4^{-2}$ g/L |
|---|---|---|---|---|---|---|---|---|
| $4^{th}$ stage brine (used as diluting solution) | 0.0020 | 0.0011 | 0.52 | 74.24 | 0.80 | 0 | *2.45 | 0.003 |

*estimated based on the assumption that its rejection by the membrane is similar to that of $Cl^-$ In some embodiments, an anti-scalant is added to the saline water before or during the process in order to prevent the deposition on the membrane of sparingly soluble chemicals (e.g., calcium carbonate, calcium sulfate (gypsum) etc.), causing it to plug. Examples of anti-scalants include, but are not limited to, Genesys LF, Genesys SI, Genesys CAS, Genesys PHO, Genesys MG, Genesys BS (Genesys International); Vitec 3000, Vitec 5100, Vitec 1500, Vitec 2000, Vitec 4000, Vitec 7000 (Avista Technologies); Pretreat Plus® 0100, Pretreat Plus® 3100, Pretreat Plus® Y2K, Pretreat Plus® Silica, Pretreat Plus® Select (King Lee Technologies), and Flocon 135 (AMI Applied Membranes), just to name a few.

The anti-scalant, being chosen as food-grade, may be safely carried over to the product water. However, if removal of the anti-scalant is desired, this may be accomplished during the optional ultrafiltration (UF) step. Specifically, an appropriate UF membrane may also be chosen such that it will reject and remove the anti-scalant while allowing all the ions in solution to pass to the permeate side.

Nanofiltration and DiaNanofiltration Membranes

The term "nanofiltration" (NF) as used herein includes any fluid purification technology that uses membranes to impede, but not prevent, the passage of a desired species. In the NF process, a part of the saline feed water pumped into the membrane assembly passes through the membrane with the salt removed (designated herein "permeate"). The remaining "concentrate" flow passes along the saline side of the membrane to flush away the concentrated salt solution (designated herein "retentate" or "brine"). The percentage of desalinated water produced versus the saline water feed flow is known as the "recovery ratio" (RR). This varies with the salinity of the feed water and the system design parameters. In accordance with the present invention, the recovery ratio is typically between 40% and 85%.

The term "DiaFiltration" as used herein refers to a process wherein low-total dissolved solids (TDS) water is added to the feed of the filtration process to improve the "wash out" of unwanted components and species that permeate preferably through the membrane. When applying diafiltration with an NF membrane on seawater, the species that are washed-out (i.e. which pass the membrane to the permeate side) are mainly mono-valent ions (e.g., $Na^+$, $Cl^-$, $Br^-$) and uncharged low molecular-weight species (e.g. $B(OH)_3$), while the multi-valent ions (namely $SO_4^{2-}$, $Ca^{2+}$ and $Mg^{2+}$ in SW), which are rejected better by the NF membrane, accumulate in the brine.

Nanofiltration membranes are well known in the art and any such membranes can be used in the context of the present invention. Examples of nanofiltration membranes are polyamide membranes, especially polypiperazineamide membranes. As examples of useful membranes can be mentioned (i) Desal-5 DL, Desal-5 DK and Desal HL by General Electrics Osmonics Inc.; (ii) NF 270, NF 245 and NF 90 by Dow Chemicals Co.; (iii) NE40 and NE70 by Woongjin Chemicals Co; (iv) Alfa-Laval NF, AlfaLaval NF 10 and Alfa-Laval NF 20 by Alfa-Laval Inc.; (v) TriSep TS40 and TS80 by TriSep Co; (vi) and Hydranautics 84200 ESNA 3J by Nitto Denko Co.; and (vii) polyethersulfone-based NP030 or NP010P (both manufactured by Nadir), or 2540-UA60-TSF (manufactured by TriSep corporation (and the like), which are membranes used for equating the total hardness (TH) to $SO_4^{2-}$ as described herein.

The nanofiltration (NF) and diaNanofiltration (DiaNF) steps of the present invention may use the same or different NF membranes. Each possibility represents a separate embodiment of the present invention.

The NF membranes can adopt any shape or configuration. Generally, there are four main types of membrane modules, each of which can be used in the context of the present invention: plate-and-frame, tubular, spiral wound, and hollow fiber. The plate-and-frame module comprises two end plates, the flat sheet membrane, and spacers. In tubular modules, the membrane is often on the inside of a tube, and the feed solution is pumped through the tube. The most popular module in industry for nanofiltration or reverse osmosis membranes is the spiral wound module. This module has a flat sheet membrane wrapped around a perforated permeate collection tube. The feed flows on one side of the membrane. Permeate is collected on the other side of the membrane and spirals in towards the center collection tube. Hollow fiber modules consist of bundles of hollow fibers in a pressure vessel. They can have a shell-side feed configuration where the feed passes along the outside of the fibers and exits the fiber ends. Hollow fiber modules can also be used in a bore-side feed configuration where the feed is circulated through the fibers.

The term "seawater reverse osmosis (SWRO) brine" refers to the retentate (brine) that is obtained from seawater that has undergone desalination using a reverse osmosis (RO) process.

The term "seawater reverse osmosis (SWRO) permeate" refers to the permeate that is obtained from seawater that has undergone desalination using a reverse osmosis (RO) process.

The term "total hardness" (TH) refers to the sum of concentrations of $Ca^{2+}$, $Sr^{2+}$ and $Mg^{2+}$ in seawater.

Reduction of $Cl^-$ Concentration in the Product Solution

The rejection of chloride is relatively high in the NF-DiaNF process of the present invention, resulting in considerable chloride concentration in the produced $Mg^{2+}$ rich solution. This phenomenon is attributed to the fact that any solution must maintain electroneutrality, and the feed water to the DiaNF process is not balanced with respect to divalent anions and cations. In other words, in seawater, the concentration of $SO_4^{2-}$ (~60 meq/l), which is the anion that is well rejected by the membrane, is much lower than the sum of concentrations of $Ca^{2+}$ and $Mg^{2+}$ (also known as "total hardness" or "TH": ~120 meq/l), which are the cations that are well rejected by the membrane, respectively. Because of this difference, it is hypothesized that $Cl^-$ had to be retained in the brine and its rejection is increased as the DiaNF process proceeds.

Figure 6:
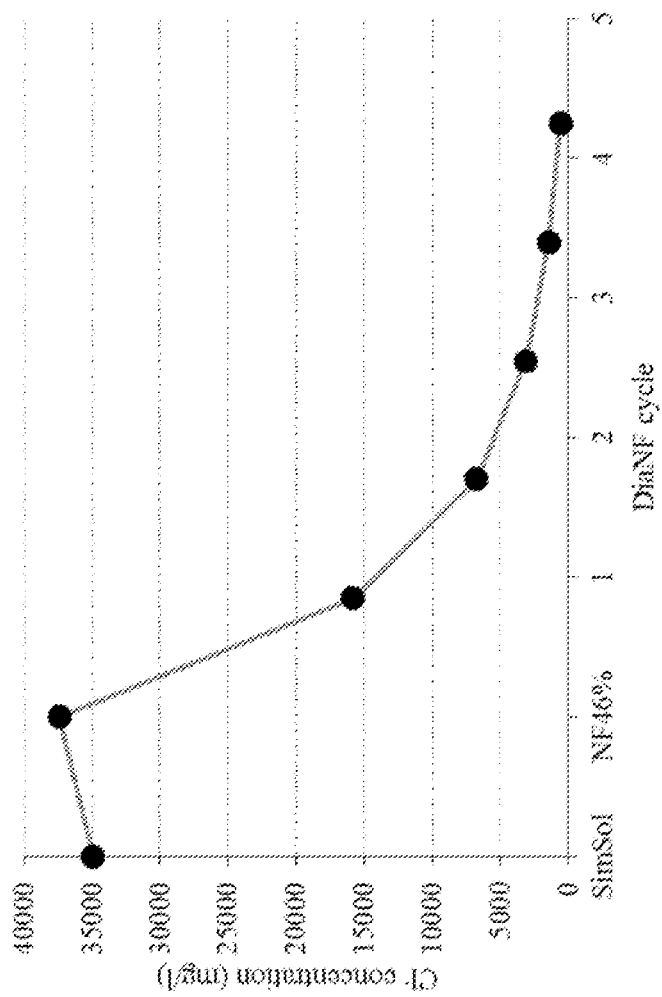
FIG. 6. Results from a DiaNF process (RR=46%, P=15 bar) using a simulative solution in which the initial $[SO_4^{2-}]$ to $([Ca^{2+}]+[Mg^{2+}]$ molar ratio was 1:1.

A simulative solution was prepared with a molar ratio of 1:1 between $[SO_4^{2-}]$ and $([Ca^{2+}]+[Mg^{2+}])$. The DiaNF process of the invention was applied (46% RR, p=15 bar) to this solution with 4.25 dilution cycles (FIG. 6). FIG. 6 shows the $Cl^-$ concentration in the simulative solution (denoted Sim-Sol on the x axis) and in the brine produced throughout the NF-DiaNF process. It is clear from these results that when the $Cl^-$ rejection is not limited by the need to maintain electro-neutrality in the rejected solution, the chloride concentration can be reduced to almost zero.

Solutions to the Inherent Electro-Neutrality Problem

The gap between the sum of divalent cations and anions can be reduced by either increasing the $SO_4^{2-}$ concentration or reducing the $[Ca^{2+}]+[Mg^{2+}]$, denoted total hardness (TH). Alternative ways for achieving either goal are listed hereinbelow.

1. Reducing the $Ca^{2+}$ and $Mg^{2+}$ Concentrations

Figure 7A:
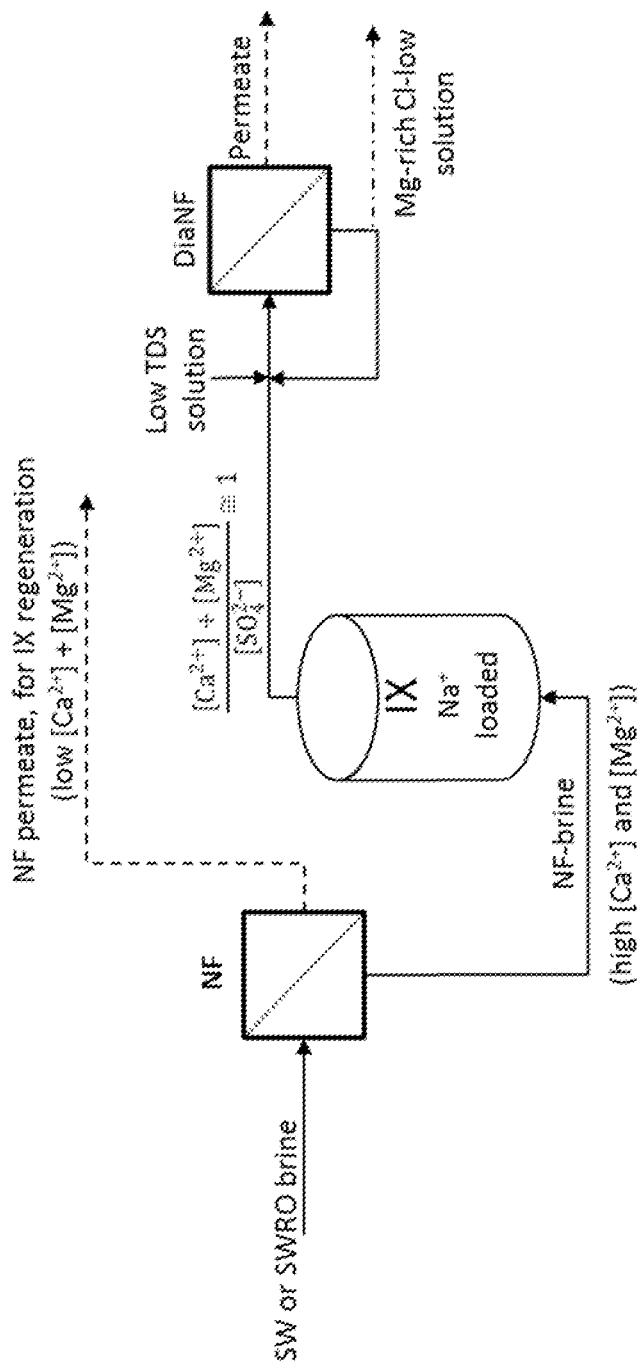
FIGS. 7A-7B. A schematic of a method for elevating $[SO_4^{-2}]$ to $[Ca^{2+}]+[Mg^{2+}]$ in the NF brine of SW or SWRO brine using a cation resin (FIG. 7A). The effluent of the exchange step is fed to the DiaNF step. The IX regeneration step is conducted with the NF permeate (FIG. 7B).
Figure 7B:
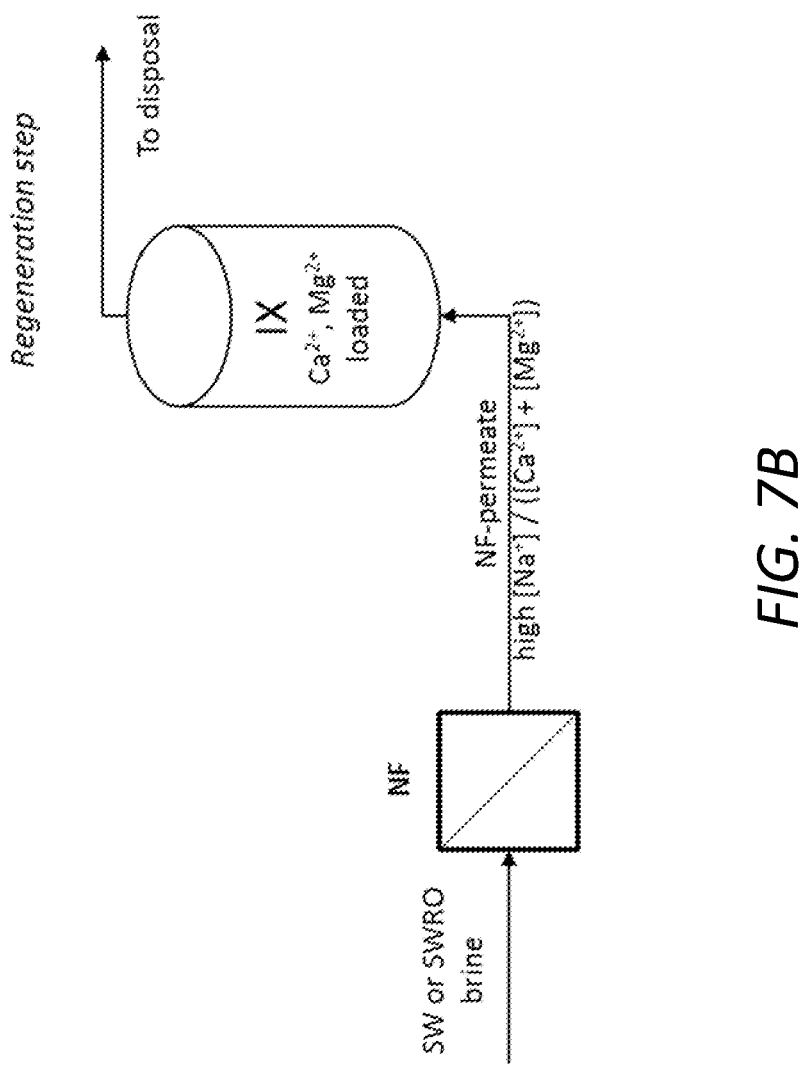

This goal can be achieved by adding a cation exchange step. The cation exchange resin used in this process has a higher affinity towards divalent ions and lower affinity towards monovalent ions. Therefore, in the exchange step, when the magnesium source solution (i.e. NF brine, SWRO brine or SW) is passed through the resin, $Ca^{2+}$ and $Mg^{2+}$ ions are adsorbed onto it, and Na+ ions are released. Thereafter, the magnesium source (e.g. the NF brine), now containing a reduced total hardness concentration (and the same $[SO_4^{2-}]$), is introduced into another NF step or into the DiaNF process, depending on the SI of the solution. Therefore, the ion exchange step should be halted at a point in which the $[Ca^{2+}]+[Mg^{2+}]$ concentration is reduced to such a degree that at the end of the DiaNF step the $Cl^-$ concentration will be low enough. After each cycle, the cation exchange resin may be regenerated, i.e. re-loaded with $Na^+$. To this end, the permeate of the NF(s) step is used as the regeneration solution (FIGS. 7A-7B). This permeate contains high concentrations of $Na^+$ and almost no $[Ca^{2+}]$ and $[Mg^{2+}]$; therefore, it is suitable for releasing $Ca^{2+}$ and $Mg^{2+}$ ions from the resin. However, the volume of this permeate is limited, in case NF brine is the magnesium source introduced to the ion exchange adsorption step. For example, if 70% recovery ratio is applied in the first NF step, then for each 0.3 m³ that passes through the resin in the exchange step only 0.7 m³ are available for regeneration. However, in case this volume of permeate is not sufficient for proper regeneration of the resin (i.e. for releasing ~100% of the total hardness absorbed in the previous cycle) supplementary regeneration can be conducted using either seawater (that also contains higher $Na^+$ to total hardness concentration ratio than the NF brine), or by using additional NF permeate that is produced exclusively for this purpose.

2. Elevation of the $SO_4^{2-}$ Concentration

Three options for elevating $SO_4^{2-}$ concentration are: (a) NF step with an open NF membrane or a closed UF membrane, which rejects $SO_4^{2-}$ at a higher concentration than it rejects divalent cations; (b) dosage of $Na_2SO_4$ salt to the feed of the DiaNF step; and (c) adding an anion exchange step.

a. NF Step with an Open NF Membrane or a Closed UF Membrane

Figure 8:
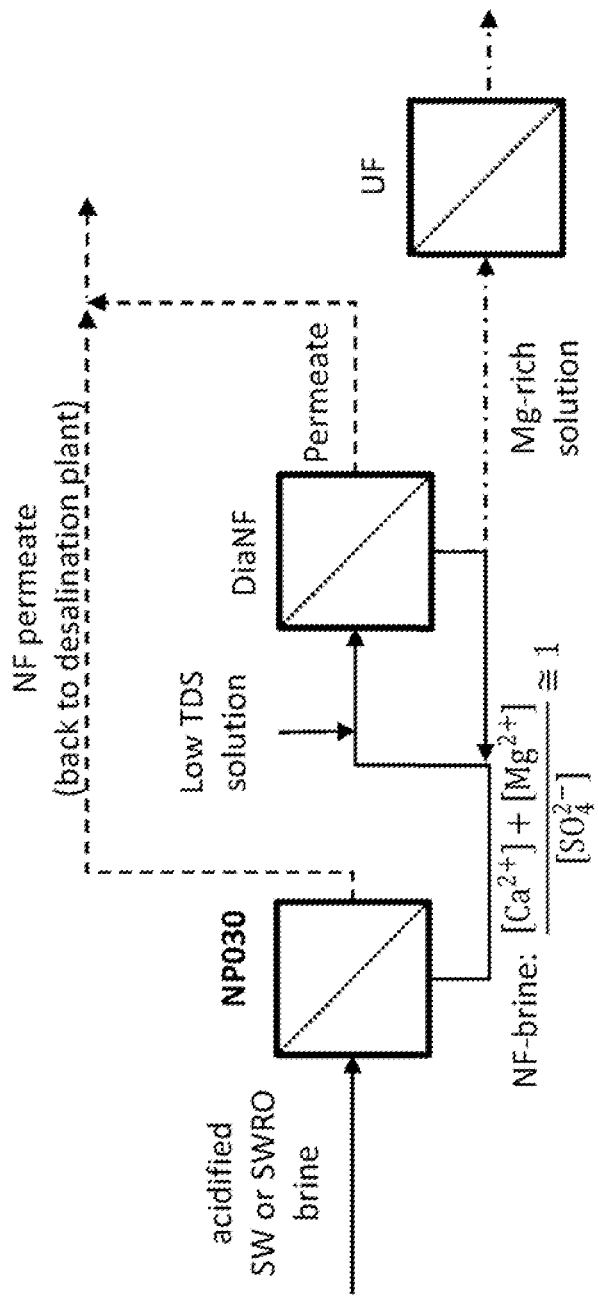
FIG. 8. Schematic presentation of the NF-DiaNF process that may be used for equating $[Ca^{2+}]+[Mg^{2+}]$ to $[SO_4^{-2}]$.
Figure 9:
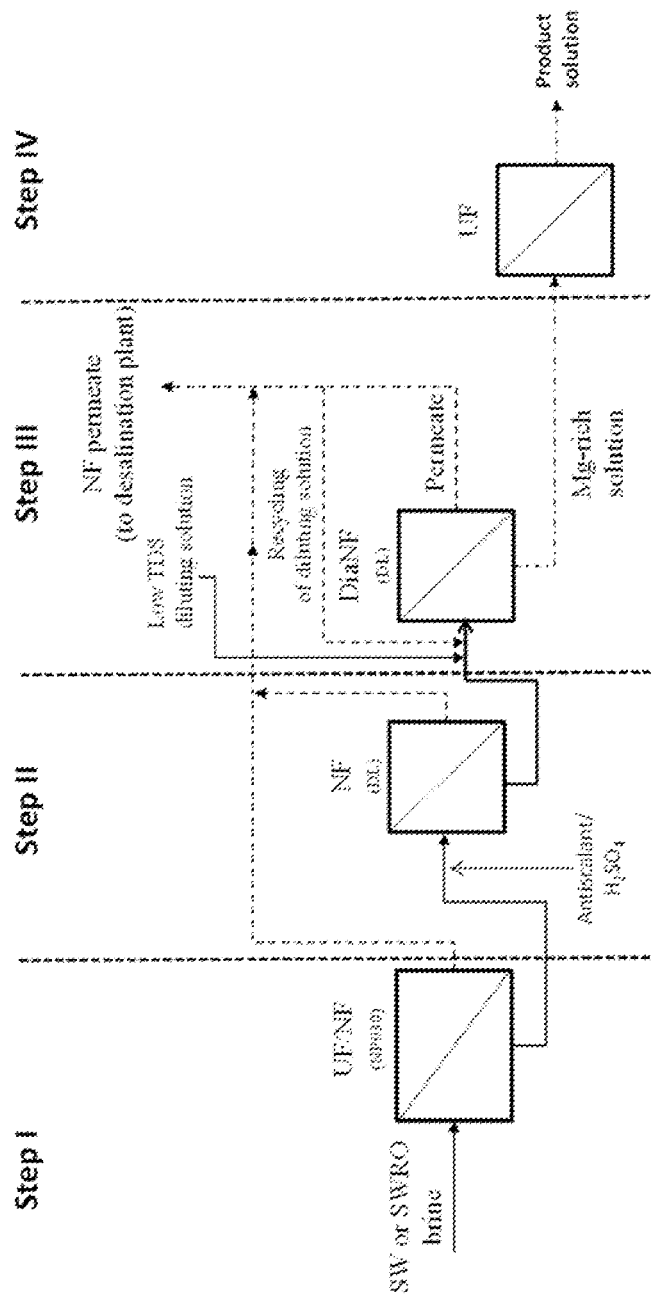
FIG. 9. Schematic of an operational sequence developed for implementing the NF-NF-DiaNF process. An open negatively-charged NF membrane is used in step I, followed by operation with a conventional NF membrane in the NF and DiaNF (Steps II & III) followed by optional ultrafiltration of the $Mg^{2+}$-rich solution for microorganisms and/or anti-scalant removal (optional Step IV). Antiscalant (AS) and $H_2SO_4$ are added to prevent $CaSO_4$ and $CaCO_3$ precipitation, respectively.

A relatively open negatively charged NF membrane can be used for retaining the $SO_4^{-2}$ in the brine, therefore elevating its concentration, while hardly rejecting the divalent cations, thus maintaining the $[Ca^{2+}]$ and $[Mg^{2+}]$ of the brine approximately constant. Alternatively, a negatively charged and relatively close (dense) UF membrane can be used for the same purpose. Such membranes should have a rejection towards $SO_4^{-2}$ considerably higher than the rejections towards divalent cations (that is, $Ca^{2+}$ and $Mg^{2+}$). One such membrane that can be used for this purpose is NP030P (manufactured by Nadir), GE Power and Water's UF membranes from the GH or GE series, or 2540-UA60-TSF (manufactured by TriSep corporation). Nanofiltration of seawater using such a membrane can produce a brine solution in which the total hardness is equal or almost equal to the $SO_4^{-2}$ concentration, and therefore it can be introduced to the DiaNF step, to result in $Mg^{2+}$ rich brine that contains almost no chloride/sodium ions. This embodiment of the process is depicted in FIGS. 8 and 9. In FIG. 8, one NF membrane is used (i.e., open NF membrane/closed UF membrane) prior to the DiaNF step. In FIG. 9, open NF membrane/closed UF membrane is used in step I, followed by operation with a conventional NF membrane in the NF and DiaNF (Steps II & III) followed by optional ultrafiltration of the Mg-rich solution for microorganisms removal (optional Step IV). One purpose of the additional NF step is to reduce the volume of water that will undergo the diaNF step (thereby reducing the volume of TDS solution which results in significant cost savings since less low TDS water will be needed for the diaNF step). In some embodiments, anti-scalant (AS) and $H_2SO_4$ are added to prevent $CaSO_4$ and $CaCO_3$ precipitation, respectively.

b. $Na_2SO_4$ Dosage

In one embodiment, $Na_2SO_4$ salt is added to the feed of the DiaNF step, at any chosen point. Such an action will raise the $SO_4^{-2}$ concentration, while maintaining the total hardness in the water at the same level.

c. Anion Exchange Step

Figure 10A:
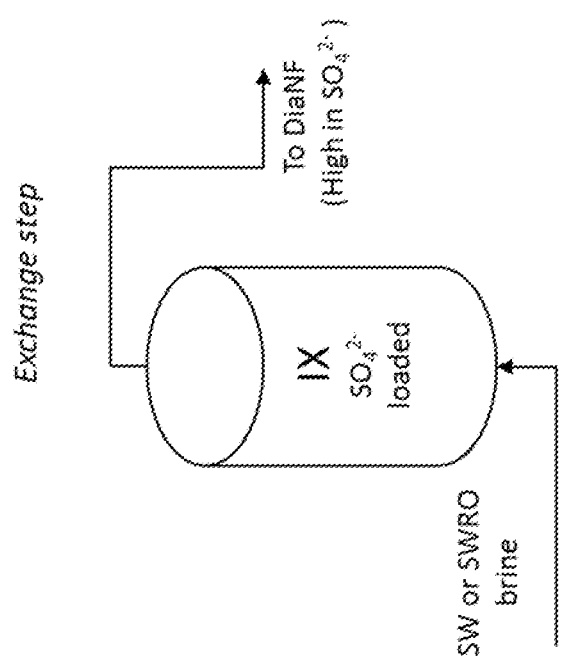
FIGS. 10A-10B. Schematic of a method for elevating $[SO_4^{-2}]$ in SW or SWRO brine using an anion exchange resin (FIG. 10A), followed by regeneration of the resin using NF brine, produced for this purpose (FIG. 10B).
Figure 10B:
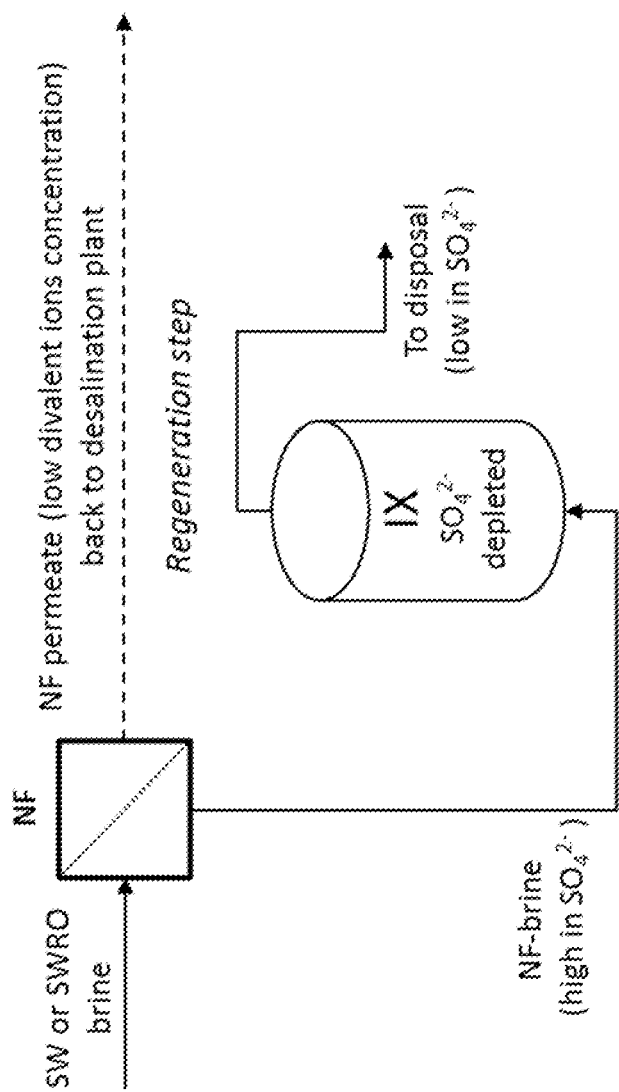

Elevation of the $SO_4^{-2}$ concentration in the feed solution (seawater or seawater RO brine) can be achieved by adding an anion exchange step prior to the DiaNF step, as illustrated in FIGS. 10A-10B. The anion exchange step is aimed at releasing $SO_4^{-2}$ ions from the resin to the feed water (e.g. seawater) fed to the ion exchange column during the exchange step, (FIG. 10A). Simultaneously, $Cl^-$ ions are absorbed from the seawater. This step continues, until the $[SO_4^{-2}]$ to $[Ca^{2+}]+[Mg^{2+}]$ ratio reaches a predefined value. At this point the exchange step ends, and the resin is depleted of $SO_4^{-2}$. Then, the resin is regenerated by passing new NF brine through it in a step termed the regeneration step, (FIG. 10B). The $[SO_4^{-2}]$ to $[Cl^-]$ ratio in the NF brine is higher than the $[SO_4^{-2}]$ to $[Cl^-]$ ratio in seawater. Therefore, $SO_4^{-2}$ will be adsorbed by the resin in this step, and $Cl^-$ will be released to the NF brine.

A combination of the above methods may be employed to further increase the efficiency of the process of the invention. Some exemplary process are depicted in the Examples hereinbelow.

The principles of the invention are demonstrated by means of the following non-limiting examples.

EXAMPLE 1

DiaNanofiltration Process

1.1 Experimental System

DiaNF experiments were carried out using low pressure cross-flow modules accommodating a 2.5" or a 4" diameter, 40" long spiral wound membrane element. The system includes an Osip riva-80 booster pump and Grundfos crn 1-27 high pressure pump. A chiller and stainless steel heat exchanger were used to maintain constant temperature of 25±2° C. All wetted piping was made of stainless steel. Flow rates and pressures were digitally and analogically measured. Two types of NF membranes were used in the experiments: Lentech DL-4040-F1021 Stinger, DL-2540-F1072 and TriSep 4040-TS80-TSF.

1.2 Experimental Procedure

Pretreated Mediterranean seawater was collected. Seawater pH was adjusted to pH4.0 using HCl and thereafter exposed to overnight air bubbling to obtain >95% $CO_2$ degasification. Thereafter, the pH was elevated to 5.5<pH<7. When needed, antiscalant (Genesys CAS) was dosed to the feed solution, to prevent membrane scaling by $CaSO_4$.

First stage SWRO brine was produced in a pilot-scale seawater desalination unit (described in detail in [14]), using Mediterranean seawater as the feed solution and hydranautics SWC5-LD-4040 membrane with applied pressure of ~61 bar and recovery ratio (RR) of 47%.

The brine of the $4^{th}$ stage was a simulative solution, prepared from analytical grade chemicals.

During the NF experiments the permeate stream was collected in a separate tank, which was placed on a scale for accurately determining the recovery ratio at any given time during the run. The brine stream, on the other hand, was continuously recirculated into the feed tank. Samples were collected during the NF step, at points representing recovery ratios lower than the final RR, as well as at the final RR. The samples were taken from the cumulative stirred permeate tank, the momentarily produced permeate, the feed and the momentary brine streams.

Similarly, during DiaNF experiments the permeate stream was collected in a separate tank and the brine was recirculated into the feed tank. However, the diluting solution was also introduced into the feed tank, to maintain constant feed volume. In other words, the permeate flow rate and the diluting solution flow rate were kept similar. This was achieved using a buoy switch connected to a pump. The feed flow rate during the DiaNF was maintained at 20 L/min. Each DiaNF experiment was equally divided in five or six sections. In each section, one fifth (or sixth) of the total volume of the diluting solution was added to the feed tank. At the end of each section, i.e. after each dosage of diluting solution at a certain volume, the system was allowed to stabilize, by directing all streams into the feed stream for at least five minutes. Thereafter, samples were taken from all streams and tanks. The same sampling procedure was practiced also in the NF experiments.

1.3 Analyses

All samples (taken from the feed and accumulated permeate tanks, brine and permeate streams) at each experimental point were analyzed for boron and major ion concentrations by a Thermo Fisher Scientific ICP-AES. Chloride concentration was measured using the Argentometric method, according to Standard Methods [15].

1.4 Simulation Tool Developed for Predicting the Results of the NF-DiaNF Process A Matlab algorithm was developed to simulate the results expected from applying the NF-DiaNF process, both from the water quality and cost standpoints. The program employs the PHREEQC software package for determining the limiting saturation index (SI) of gypsum ($CaSO_4$) and for calculating the expected $Cl^-$ concentration, based on electro-neutrality (PHREEQC database: SIT). Full sets of process operational conditions were examined, differing in the following parameters: the NF membrane used (two membranes were considered); the number of required DiaNF cycles (altogether, a maximum of eight cycles was assumed, with option to altering the membrane used during the cycles); varying pressures and recovery ratios (RR).

The program relies on preliminary experimental results, from which the rejections of major SW ions for the two membranes were calculated, at varying operational conditions. The program was used to conclude on the final brine characteristics, achieved at the various operational parameters, in order to conclude on the favorable operation scheme, as well as to conclude on possible scaling problems and the need for antiscalant dosage.

1.4.1 Testing the Adequacy of Two NF Membranes

Two membrane types were selected for testing: DL-2540-F1072 (Lenntech) and 4040-TS80-TSF (TriSep), denoted herein DL and TS80, respectively. NF-DiaNF experiments were performed using the 2.5" DL membrane (at pressure of 10 bars and RR ranging from 10% to 80%) and the TS80 membrane (at 10 bars and RR 10% to 90%). The rejections of major ions by the two membranes for use in the simulation tool were derived from these experiments.

2. Results and Discussion

Figure 3:
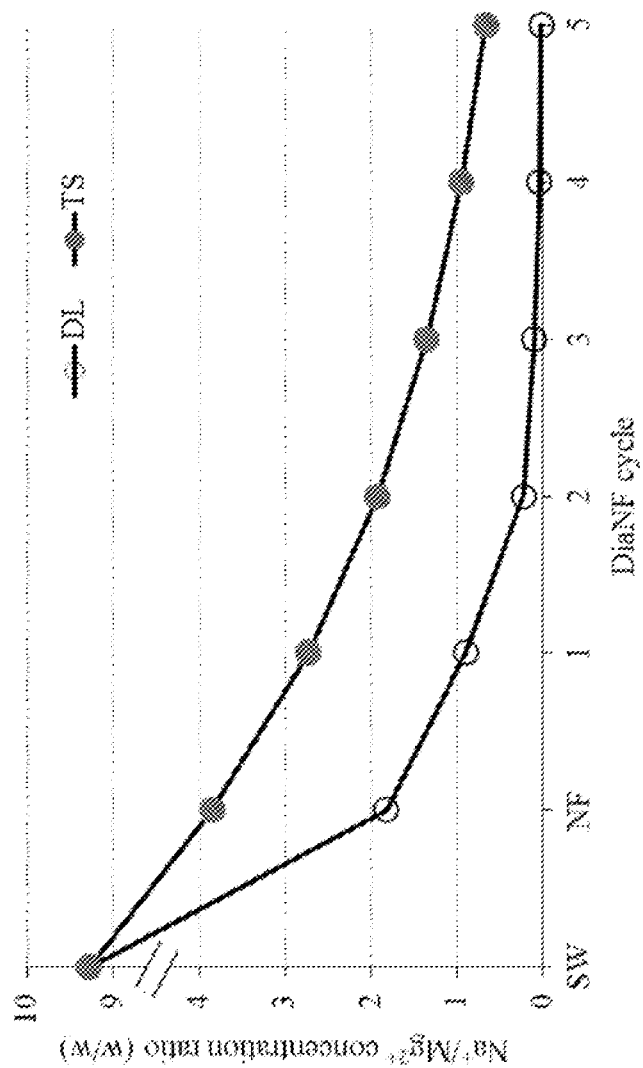
FIG. 3: Simulation results for TS80 and DL membranes, simulating an NF-DiaNF process with SW as the $Mg^{2+}$ source, RR of 80% and five DiaNF dilution cycles.

2.1 Results Obtained and Conclusions Derived from Applying the Simulation Tool The simulation program was used to decide on the NF membrane best suited for the process, out of the two membranes tested. Combining the two membranes within the DiaNF procedure was also considered. The results, shown in FIG. 3, indicated that the DL membrane was advantageous over the TS80 for the purpose of selectively extracting $Ca^{2+}$ and $Mg^{2+}$ ions from SW, the reason attributed to the relative high rejection of multivalent ions along with the apparent low rejection of monovalent ions by this membrane. Consequently, the number of dilution cycles required for reducing the overall monovalent ion concentrations was lower when the DL membrane was used, compared to the number of cycles required when the TS80 membrane was considered, resulting in a much lower operational cost. Furthermore, the conclusion from the results was that the DL membrane should be applied alone within the process. Regarding the DL membrane: slight differences were observed between the (3 year old) 2.5" and (new) 4" modules used. However, the results obtained from the application of both modules led to the following (similar) conclusions: (1) No advantage was found in conducting more than four DiaNF cycles, i.e. the water quality of the product solution hardly improved after the fourth cycle; (2) Using SW as feed, a RR of 50% could be attained without a need for antiscalant (AS) dosage, the reason being that the SI of $CaSO_4$ in the brine (feed) decreased at a low rate during the evolution of the DiaNF process, due to the relatively low rejection of the membrane towards calcium; (3) The SI of $CaCO_3$ was maintained negative throughout the operation due to the removal of inorganic carbon in the pretreatment step; (5) When SW is the initial feed solution, dosage of antiscalant enables elevating the RR up to 80%. When $1^{st}$ stage SWRO brine is the initial feed solution, antiscalant dosage enables elevating RR up to 75%.

The experimental conditions of all the tested scenarios were decided based on these conclusions, e.g. all the subsequent experiments were conducted with DL as the sole membrane. Three main parameters were evaluated for comparing the results obtained in the tested alternatives: the $Mg^{2+}$ concentration in the product solution, the $Cl^-$ to $Mg^{2+}$ and $Na^{2+}$ to $Mg^{2+}$ concentration ratios and the volume of diluting solution required to attain the product solution.

2.2 Experimental Results

2.2.1 Results of the Fundamental NF-DiaNF Operation

In all the experiments representing the fundamental-process, de-carbonated SW was first nanofiltered up to a predefined RR. Thereafter, DiaNF cycles were applied, using distilled water as the diluting solution, at a continuous mode. The experiments differed from each other in the RR (40% and 70%) and applied pressures (10 and 15 bars). Working with RR of 40% at both pressures led to almost identical results with respect to the major ion concentrations along the dilution cycles. As a result, the $Mg^{2+}$ concentrations in the solutions produced after the DiaNF step were almost similar: 1786 mg/l and 1832 mg/l at 10 bar and 15 bar, respectively. The $Na^+$ to $Mg^{2+}$ mass ratio was also similar: 0.1 and 0.09 at 10 and 15 bar, respectively. As opposed to the 40% RR experiment, at RR of 70% major differences were observed between the results obtained in the two applied pressures: the final $Mg^{2+}$ concentrations were 2677 mg/l and 3346 mg/l at 10 bar and 15 bar, respectively and the $Na^+$ to $Mg^{2+}$ mass ratios were 0.21 and 0.11 in the 10 bar and 15 bar, respectively. These differences were attributed to the lower water fluxes recorded at the lower pressure, resulting in a significantly longer retention time of the brine in contact with the membrane, which led to a higher net diffusion of all the ions through it. As a result, the brine concentrations of all the ions were reduced, however the reduction in the $Mg^{2+}$ rejection was more pronounced than the reduction in the rejection of $Na^+$, leading to a higher $Na^+$ to $Mg^{2+}$ ratio. As opposed to $Na^+$ (and other positive monovalent ions), the rejection of $Cl^-$ was not governed only by its concentration and the membrane's morphology but also by the need to maintain electro-neutrality in the brine solution. The main divalent anion in seawater is $SO_4^{2-}$, present at ~60 meq/l, while the main multivalent cations are $Ca^{2+}$ and $Mg^{2+}$, present at 20 and 105 meq/l, respectively. Since multivalent ions are better rejected than monovalent ions by NF membranes, the gap between the sum of $Mg^{2+}$ and $Ca^{2+}$ and $SO_4^{2-}$ has to be balanced by (mainly) $Cl^-$ to maintain electro neutrality.

Table 2 shows average (n=3) results of experiments conducted to evaluate the fundamental NF-DiaNF process. In Table 2, it is noticeable that even after more than 2 DiaNF cycles the $SO_4^{2-}$ equivalent charge concentration (206 meq/l) did not balance the sum of equivalent charges of the divalent cations (313 meq/l), therefore, $Cl^-$ had to be retained in the brine and its rejection increased as the DiaNF process proceeded. To reduce the concentration of $Cl^-$ the gap between the sum of divalent cations and anions should be reduced, e.g. by replacing $Cl^-$ by $SO_4^{2-}$ via an ion exchange resin. This issue is addressed in Example 2.

Figure 4A:
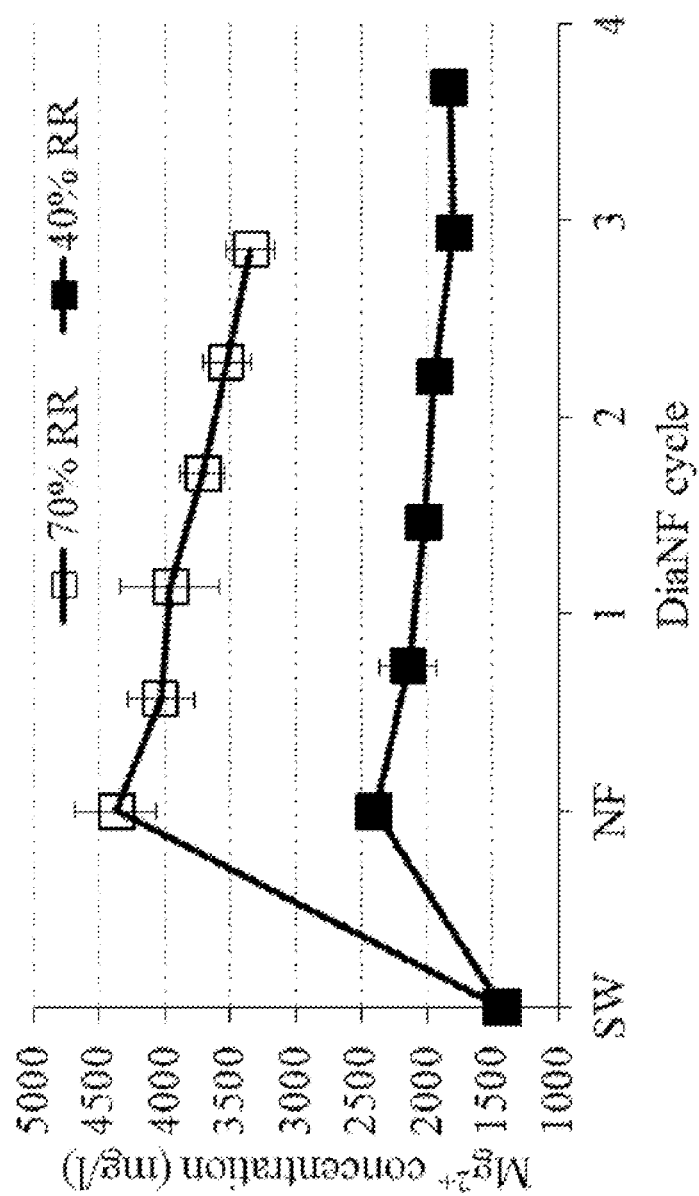
FIGS. 4A-4B: Average (n=3) $Mg^{2+}$ concentration (mg/l) and $Na^+$ to $Mg^{2+}$ concentration ratios (w/w) (FIGS. 4A and 4B, respectively) in the solution produced by the fundamental NF-DiaNF process at 40% and 70% RR (filled and blank markers, respectively) at 15 bar pressure.
Figure 4B:
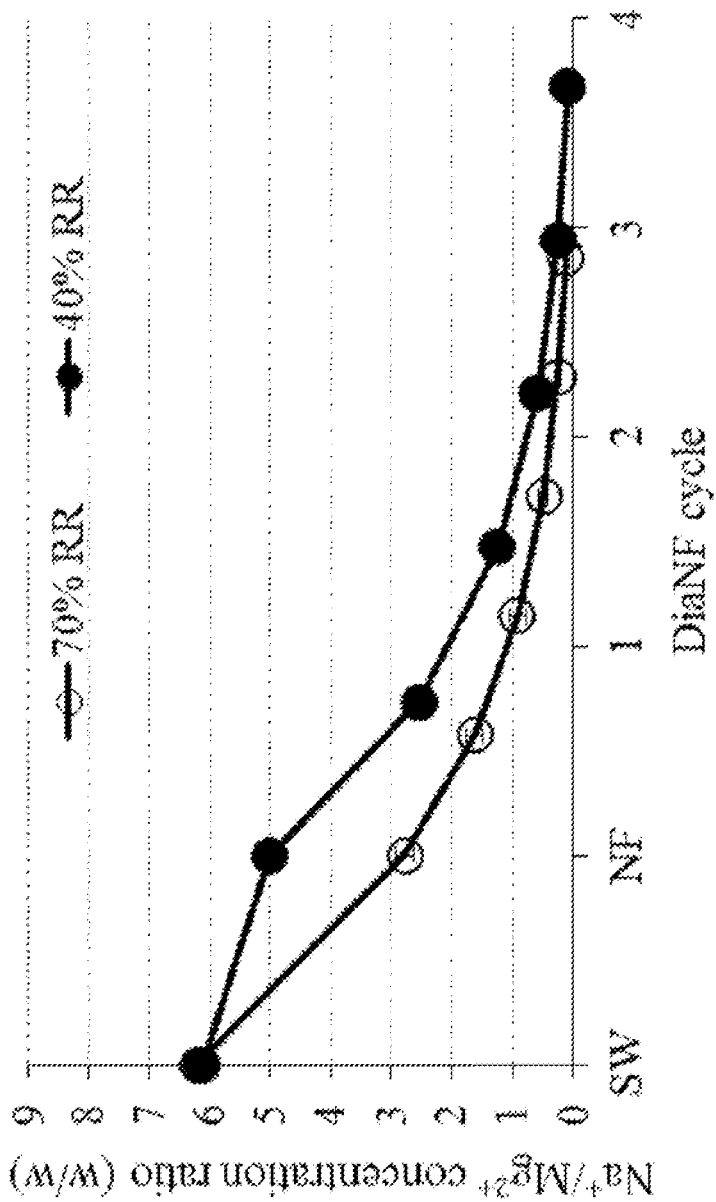

From an operational standpoint, it is beneficial to work at a high RR which corresponds to smaller dilution solution volume and at a higher pressure, which results in higher $Mg^{2+}$ concentration and lower CAPEX (smaller footprint). Bearing this in mind, the full results from a NF-DiaNF experiment with a RR of 70% and 15 bar pressure are shown in FIGS. 4A-4B and Table 2. From these results one can choose the desired operational scheme, considering the required water quality and the associated cost. For example, when $Cl^-$ and $Na^+$ concentrations are not restricted by regulation in the final product water, a single DiaNF cycle is probably preferable, due to the fact that the dilution solution comes almost free of cost, and the additions of $Na^+$, $Cl^-$ and B to the desalinated water product are merely 1.09, 3.27 and 0.000577 mg/l, respectively per one mg/l of $Mg^{2+}$ added to the water (at these conditions the $Ca^{2+}$ addition to the water is 0.26 mg/l). Performing additional DiaNF cycles will reduce the concentrations of the unwanted ions but also raise the cost.

TABLE 2

Results from operating the fundamental process (RR = 70% P = 15 bar): concentrations of ions and concentration ratio in the feed solution (SW), in the brine of the NF step, and along the DiaNF process.

|  | unit | SW | NF | \multicolumn{6}{c}{DiaNF cycle*} |
|---|---|---|---|---|---|---|---|---|---|
|  |  |  |  | 0.57 | 1** | 1.14 | 1.71 | 2.29 | 2.86 |
| $Ca^{2+}$ | g/L | 0.46 | 1.38 | 1.10 | 1.04 | 1.02 | 0.92 | 0.85 | 0.76 |
| $Mg^{2+}$ | g/L | 1.36 | 4.37 | 4.03 | 3.98 | 3.96 | 3.72 | 3.53 | 3.35 |
| $Na^+$ | g/L | 11.82 | 12.12 | 6.52 | 4.32 | 3.59 | 1.81 | 0.89 | 0.39 |
| B | mg/l | 5.00 | 4.46 | 3.18 | 2.30 | 2.01 | 1.45 | 0.99 | 0.64 |
| $Cl^-$ | g/L | 20.79 | 26.40 | 16.45 | 12.99 | 11.84 | 8.16 | 6.18 | 5.09 |
| $Sr^{2+}$ | mg/l | 8.60 | 22.28 | 20.28 | 19.83 | 19.68 | 18.65 | 17.49 | 16.47 |
| $Br^-$ | mg/l | 72.86 | 92.51 | 57.65 | 45.21 | 41.48 | 28.60 | 21.66 | 17.83 |

TABLE 2-continued

Results from operating the fundamental process (RR = 70% P = 15 bar): concentrations of ions and concentration ratio in the feed solution (SW), in the brine of the NF step, and along the DiaNF process.

|  | unit | SW | NF | DiaNF cycle* | | | | | |
|---|---|---|---|---|---|---|---|---|---|
|  |  |  |  | 0.57 | 1** | 1.14 | 1.71 | 2.29 | 2.86 |
| $SO_4^{-2}$ | g/L | 3.08 | 11.47 | 10.85 | 10.80 | 10.78 | 10.54 | 10.23 | 9.92 |
| $Na^+/Mg^{2+}$ | w/w | 8.69 | 2.77 | 1.62 | 1.09 | 0.91 | 0.49 | 0.25 | 0.12 |
| $Cl^-/Mg^{2+}$ | w/w | 15.29 | 6.05 | 4.08 | 3.27 | 3.00 | 2.20 | 1.76 | 1.52 |

*"DiaNF cycle" represents the volume of diluting solution applied at the time of sampling relative to the initial volume of feed to the DiaNF process.
**Results for the single DiaNF cycle are calculated via interpolation.

2.2.2 Results from the Operation of a Counter Current NF-DiaNF Process

Experiments were conducted to evaluate the counter current process under the following conditions: SWRO brine was used as the $Mg^{2+}$ source; RR of 45% was applied at pressure of 15 bars; the DiaNF process was operated using the recycled permeate in the first 1.6 cycles, that is, the ratio between the volume of the diluting solution and the volume of the initial feed to the DiaNF step was 1.6, and distilled water (representing RO permeate) was used in the last 1.6 cycles. The relatively low RR was chosen based on simulative results which showed an increase in the SI of gypsum in the first counter-current DiaNF cycles (where the permeate of the previous operation was used as the diluting solution), as a result of the addition of $Ca^{2+}$ and $SO_4^{2-}$ from the permeate to the brine. A safety factor was thus taken to ensure that no gypsum would precipitate.

Figure 5A:
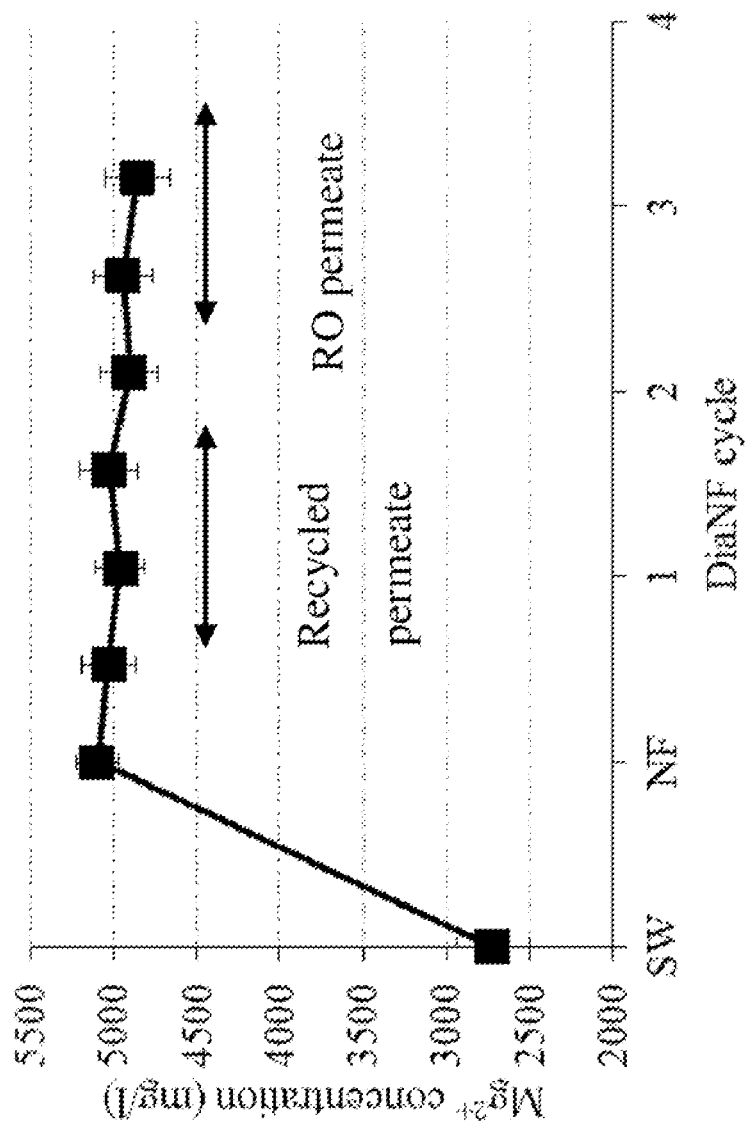
FIGS. 5A-5B. Results of the counter current NF-DiaNF Scenario (45% RR, P=15 bar) showing the $Mg^{2+}$ concentration and the concentration ratio between $Na^+$ and $Mg^{2+}$ (FIGS. 5A and 5B, respectively) in the brine produced along the NF-DiaNF process.
Figure 5B:
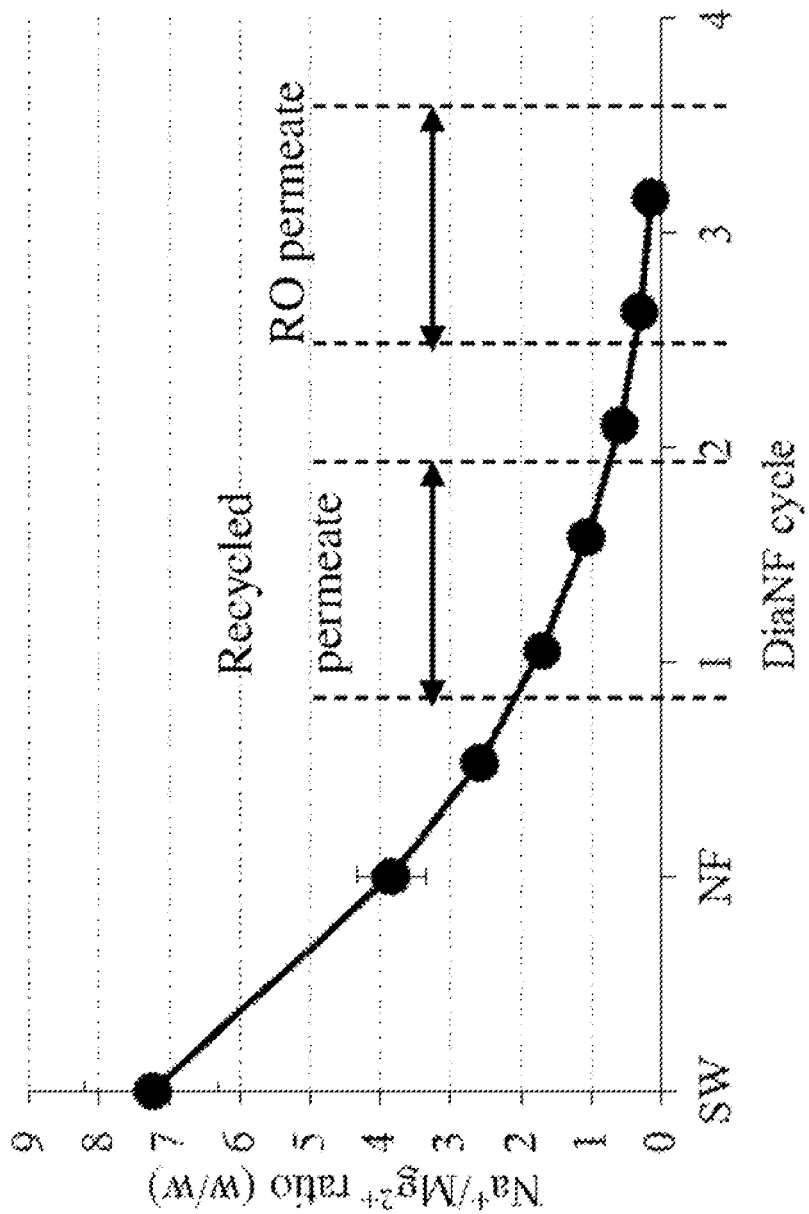

FIGS. 5A-5B show the $Mg^{2+}$ concentration and the $Na^+$ to $Mg^{2+}$ concentration ratio obtained in this process sequence. It is apparent that the $Na^+$ to $Mg^{2+}$ concentration ratio dropped to a value approaching zero and that the $Mg^{2+}$ concentration remained almost constant throughout the operation.

When the permeate solution of the last DiaNF cycles is recycled, monovalent ions are introduced to the feed solution with the diluting solution, thus their concentration in the product solution can be expected to be slightly higher than in the absence of such recycling. $SO_4^{2-}$, $Mg^{2+}$ and $Ca^{2+}$, on the other hand, are also introduced with the diluting solution, and unlike monovalent ions, their rejection by the membrane is high; thus, their concentrations are expected to increase (or at least not decrease) in the first DiaNF cycles compared to conventional DiaNF operation.

2.2.3 Results of Operation of NF-DiaNF Process with Partial Application of a Cheap Diluting Solution Table 3 shows the average (n=3) product solution characteristics throughout a NF-DiaNF process in which SWRO-$1^{st}$-stage brine was the $Mg^{2+}$ source and $4^{th}$-stage-brine was used as the diluting solution in the first 2.45 DiaNF cycles. The solution produced after this step was nanofiltered to a RR of 60% thereby reducing the volume of the brine to 40% of its initial value. Thereafter, 2.1 additional dilution cycles were applied using distilled water (representing SWRO permeate). With respect to the $Cl^-$ to $Mg^{2+}$ concentration ratio, a significant reduction was achieved in the first 2.45 cycles, however the ratio may still be too high for some applications. In addition, the boron concentration, originating in this case mainly from the diluting solution (see Table 1), was also excessively high. It is noted that a diluting solution such as the used $4^{th}$ stage brine is produced in desalination plants aiming at very low B concentration in the desalinated water product typically in addition to a very low $Cl^-$ concentration. Therefore, further DiaNF cycles with low-TDS water are probably essential. Table 3 shows that the implementation of this scenario led to the production of a relatively selective $Mg^{2+}$ solution (concentration ratios of <2 and <2·10$^{-3}$ for $Cl^-$ to $Mg^{2+}$ and B to $Mg^{2+}$, respectively) while using a ratio of 0.85:1 between distilled water and the initial SWRO brine feed volume, i.e. using 1 m$^3$ of SWRO brine and 0.85 m$^3$ of distilled water produced a relatively selective $Mg^{2+}/Ca^{2+}/SO_4^{2-}$ solution with as much as 2.09 kg of $Mg^{2+}$.

TABLE 3

Results from partial application of a cheap diluting solution (p = 15 bar)

|  | unit | SWRO brine | DiaNF ($4^{th}$ Ashkelon brine) DiaNF cycle* 2.45 | NF (RR60%) | DiaNF DiaNF cycle* | | | |
|---|---|---|---|---|---|---|---|---|
|  |  |  |  |  | 0.50 | 1.00 | 1.60 | 2.10 |
| $Ca^{2+}$ | g/l | 0.79 | 0.68 | 1.65 | 1.51 | 1.40 | 1.31 | 1.20 |
| $Mg^{2+}$ | g/l | 2.36 | 2.31 | 5.92 | 5.60 | 5.47 | 5.41 | 5.22 |
| $Na^+$ | g/l | 19.47 | 2.19 | 1.71 | 0.68 | 0.25 | 0.08 | 0.05 |
| B | mg/l | 7.08 | 74.06 | 73.41 | 43.99 | 26.73 | 16.21 | 9.25 |
| $Cl^-$ | g/l | 35.55 | 7.41 | 13.32 | 10.74 | 9.63 | 9.08 | 8.32 |
| $Sr^{2+}$ | mg/l | 13.06 | 13.02 | 32.01 | 29.86 | 28.84 | 27.94 | 26.32 |

TABLE 3-continued

Results from partial application of a cheap diluting solution (p = 15 bar)

| | unit | SWRO brine | DiaNF (4$^{th}$ Ashkelon brine) DiaNF cycle* 2.45 | NF (RR60%) | DiaNF DiaNF cycle* | | | |
|---|---|---|---|---|---|---|---|---|
| | | | | | 0.50 | 1.00 | 1.60 | 2.10 |
| $Br^-$ | mg/l | 124.58 | 25.98 | 46.68 | 37.64 | 33.75 | 31.82 | 29.15 |
| $SO_4^{2-}$ | g/l | 5.44 | 5.51 | 14.30 | 13.67 | 13.66 | 13.68 | 13.69 |
| $Na^+/Mg^{2+}$ | w/w | 8.25 | 0.95 | 0.29 | 0.12 | 0.05 | 0.01 | 0.01 |

*"DiaNF cycle" represents the volume of diluting solution applied at the time of sampling relative to the initial volume of feed to the DiaNF process

2.3 Assessing the Suggested Improvements to the Fundamental DiaNF Operation

In order to evaluate the suggested improvements from the water quality point of view, the Mg-rich solutions produced in the different alternatives were compared and the results are shown in Table 4. Table 4 shows the addition of ions as a result of applying the developed process scenarios for adding $Mg^{2+}$ to desalinated water to result in a concentration of 10 mg Mg/l [3]. The table includes both the additions of unwanted species (represented by $Cl^-$, $Na^+$, $Br^-$, $Sr^{3+}$ and B), and welcomed ions, such as $Ca^{2+}$ and $SO_4^{2-}$. Note that none of these scenarios can be applied in the modern SW desalination plants in Israel, due to the strict requirement in the bids according to which the overall $Cl^-$ concentration in the desalinated water product should not exceed 20 mg/l. However, it is also noticeable that applying each of the described scenarios results in $Cl^-$ and $Na^+$ additions lower than 19.3 mg/l and 1.5 mg/l, respectively, which is fairly low. For comparison, with respect to drinking water, WHO guidelines do not include a health-based guidelines for $Cl^-$ and $Na^+$, but rather mention taste thresholds in the range of 200-300 mg/l and ~200 mg/l ($Cl^-$ and $Na^+$, respectively). The restriction on $Cl^-$ and $Na^+$ concentrations in water used for irrigation purposes (as is the case, for example, in Israel and Spain), is more case specific, since it is a function of the crops sensitivity, the irrigation method applied, the general water scarcity and whether or not the resulting wastewater is reclaimed and reused for agricultural irrigation. Generally speaking, irrigation water containing $Cl^-$ and $Na^+$ concentrations lower than 140 mg/l and 70 mg/l, respectively, imply low risk on crops. Finally, it should be noted that the risk related to high $Na^+$ concentrations (high sodium adsorption ratio (SAR) values) is reduced when the $Ca^{2+}$ and $Mg^{2+}$ concentrations are elevated, as will be the result in the suggested approach. To conclude, the $Cl^-$ and $Na^+$ additions to desalinated water resulting from $Mg^{2+}$ enrichment by the developed technique are effectively negligible.

With respect to boron addition, from the health perspective, none of the suggested scenarios result in an excessively high B addition, considering that the WHO recommended threshold for boron in drinking water is 2.4 mg/l. However, for the purpose of irrigation of sensitive crops it seems that using a diluting solution rich in B leads to relatively high B concentrations, which might limit the implementation of the process, considering that in Israel and Spain the maximal B concentration allowed in desalinated water is 0.3 and 0.5 mg/l, respectively. In such places, the operation of the process should be such that the B levels would remain low, such as in the "fundamental" process and the counter current DiaNF, for example. With respect to the addition of $SO_4^{2-}$ with $Mg^{2+}$, this can be considered an improvement in the water quality [2] and is anyway equivalent to the result of dosing $MgSO_4$ to the water.

TABLE 4

Concentration of components added to the soft water at the three tested NF-DiaNF scenarios, as a result of producing soft water with 10 mg $Mg^{2+}$ per liter

| Component added units | B mg/l | $Cl^-$ mg/l | $Na^+$ mg/l | $Ca^{2+}$ mg/l | $SO_4^{2-}$ mg/l | $Br^-$ mg/l | $Sr^{2+}$ mg/l |
|---|---|---|---|---|---|---|---|
| Fundamental operation (single dilution cycle) | $5.79 \cdot 10^{-3}$ | 32.66 | 10.87 | 2.61 | 27.14 | $1.14 \cdot 10^{-1}$ | $4.99 \cdot 10^{-2}$ |
| Fundamental operation (70% RR, P = 15 bar) | $1.24 \cdot 10^{-3}$ | 15.21 | 1.16 | 2.26 | 29.63 | $3.70 \cdot 10^{-2}$ | $4.92 \cdot 10^{-2}$ |
| Counter current DiaNF | $1.33 \cdot 10^{-3}$ | 19.26 | 1.46 | 2.46 | 21.74 | $4.10 \cdot 10^{-2}$ | $5.14 \cdot 10^{-2}$ |
| Cheap diluting solution | $1.77 \cdot 10^{-2}$ | 15.93 | 0.16 | 2.29 | 28.62 | $3.26 \cdot 10^{-2}$ | $5.32 \cdot 10^{-2}$ |

3. Conclusions

A new process for adding $Mg^{2+}$ to soft and desalinated water is presented. The process is based on an NF step followed by DiaNF cycle(s). Combining these two steps for extracting $Mg^{2+}$, $Ca^{2+}$ and $SO_4^{2-}$ from seawater or SWRO brines was shown to be highly feasible.

Both the theoretical examination and the experimental results show that applying high recovery ratios leads to a better water quality (lower $Cl^-/Mg^{2+}$ and $Na^+/Mg^{2+}$ concentration ratios) for given diluting cycles.

Different operational alternatives result in different water qualities. For example, applying a single DiaNF cycle and using SW as the $Mg^{2+}$ source results in $Cl^-/Mg^{2+}$ and $Na^+/Mg^{2+}$ (w/w) ratios of 3.27 and 1.09, respectively; while applying 2.86 dilution cycles reduces the ratios to 1.52 and 0.12, respectively.

A cheap diluting solution can be used in the first DiaNF cycle(s). However, depending on its quality, the resultant $Mg^{2+}$ solution might be inferior to the solution produced when only RO permeate is used as the diluting solution.

Counter current application can reduce the cost of the process while attaining almost the same water quality.

In all the examined scenarios, the produced $Mg^{2+}$ solution could be used for enriching soft waters with 10 mg Mg/L, while complying with the WHO drinking water quality guidelines and be appropriate as irrigation water.

The process of the present invention can be applied on any soft water, provided that seawater is available. It is also independent of the post treatment applied in desalination plants and can therefore be applied regardless of the existing infrastructure.

In case antiscalant dosage should be avoided, a relatively lower RR should be applied, leading to (approximately) doubled process costs.

EXAMPLE 2

Reduction of the Cl⁻ Concentration in the Product Solution

The NF-DiaNF process of the present invention was applied to achieve chloride minimization (i.e., reduce the $TH/SO_4^{2-}$ ratio), using a Nadir NP030 membrane. The feed was seawater. The pressure applied in the experiment was 20 bar. A high pressure vessel was placed on a magnetic stirrer and high stirring speed was maintained throughout the experiment. The permeate was collected in a measuring cylinder. Small volumes of samples of permeate were taken for ICP analysis at predefined volumes representing predefined recovery ratios.

The concentrations measured in the permeate water and in the initial feed solution were used for calculating the concentrations in the brine at each recovery ratio, based on mass balance equation:

$$V_B \cdot C_B = V_{F0} \cdot C_{F0} - V_{PA} \cdot C_{PA} \tag{1}$$

wherein C represents for solute concentration, and V represents the solution volume. The subscripts B, F0 and PA stand for the brine (accumulated brine), the initial feed solution and the accumulated permeate.

The permeate concentrations were also used for calculating the rejection of ions (r), using Eq. (2):

$$r = 1 - \frac{C_{PA}}{C_{Fo}} \tag{2}$$

Figure 14:
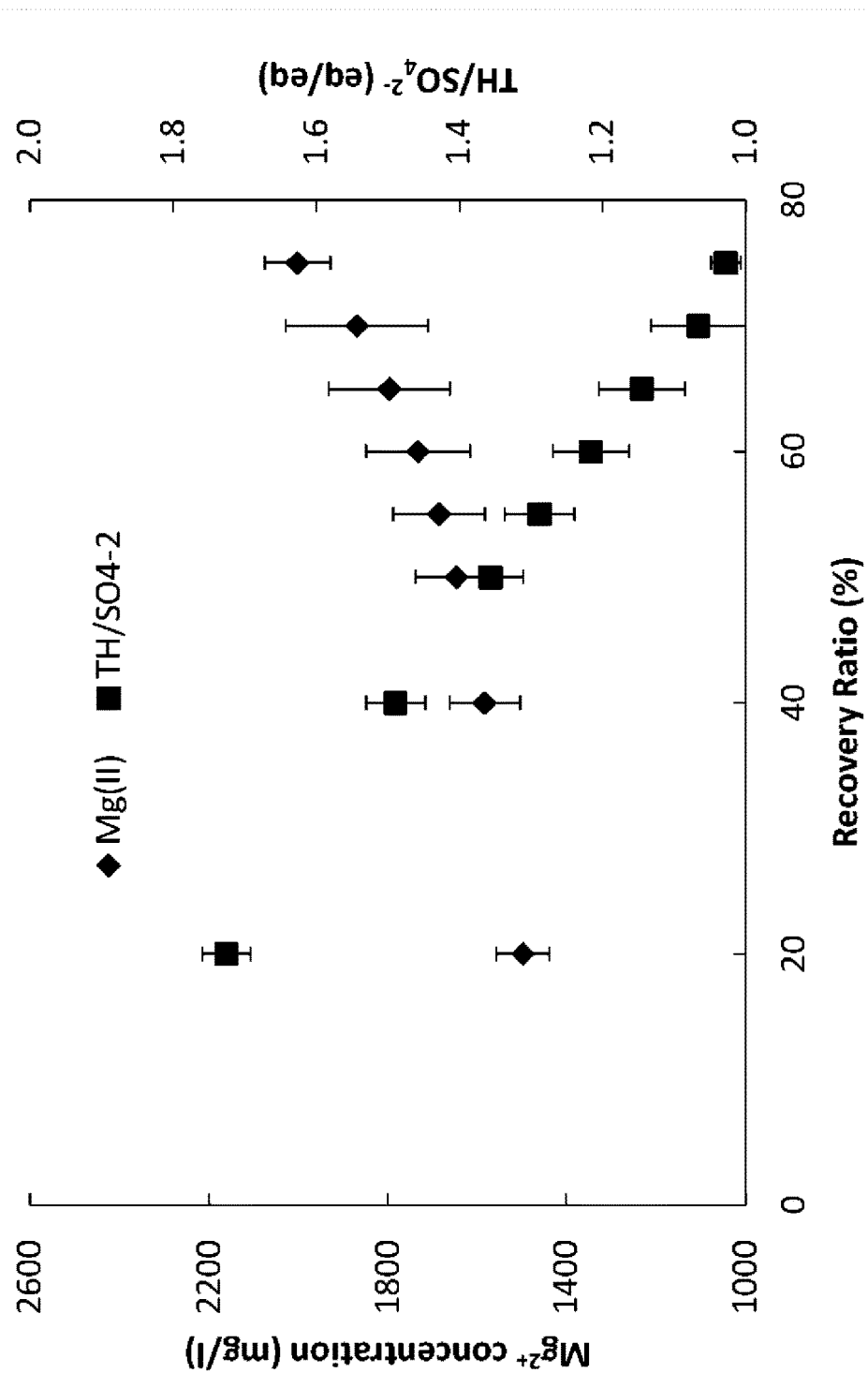
FIG. 14. The Mg(II) concentration and total hardness (TH) to $SO_4^{2-}$ ratio attained in the brine of seawater nanofiltration application using flat sheet Nadir NP030 membrane, as a function of the recovery ratio (P=20 bar).

The results of applying the NF step with NadirNP030 are summarized in Table 5 and FIG. 14.

TABLE 5

Results of ion concentrations and total hardness to sulfate ratio (eq/eq) in the brine attained upon seawater nanofiltration with NadirNP030 membrane (pressure = 20 bar).

| Recovery ratio (%) | Ca(II) mg/l | K(I) mg/l | Mg(II) mg/l | Na(I) mg/l | $SO_4^{2-}$ mg/l | Cl- mg/l | TH/$SO_4^{-2}$ |
|---|---|---|---|---|---|---|---|
| 0 | 505 | 518 | 1502 | 13390 | 1214 | 23267 | |
| 20 | 510 | 518 | 1498 | 13312 | 1379 | 22855 | 1.726 |
| 40 | 541 | 537 | 1584 | 13785 | 1690 | 23332 | 1.489 |
| 50 | 558 | 550 | 1646 | 14104 | 1926 | 23670 | 1.356 |
| 55 | 571 | 558 | 1685 | 14304 | 2078 | 23823 | 1.287 |
| 60 | 587 | 567 | 1732 | 14536 | 2261 | 23997 | 1.216 |
| 65 | 608 | 579 | 1796 | 14808 | 2489 | 24179 | 1.145 |
| 70 | 632 | 592 | 1869 | 15123 | 2781 | 24298 | 1.066 |
| 75 | 709 | 621 | 2002 | 15733 | 3115 | 24953 | 1.028 |

NF-DiaNF Step

For reducing the chloride concentration six DiaNF cycles were performed on the brine produced at 75% recovery (last row in Table 6). The results are summarized in Table 6. Note that the results in the 1$^{st}$ row in Table represent a different ICP analysis of the 75% recovery brine.

TABLE 6

Results of DiaNF cycles performed with Lentech DL-4040-F1021 (P = 15 bar)

| RR % | $Ca^{2+}$ mg/l | $K^+$ mg/l | $Mg^{2+}$ mg/l | $Na^+$ mg/l | $SO_4^{2-}$ mg/l | $Sr^{2+}$ mg/l | $Cl^-$ mg/l |
|---|---|---|---|---|---|---|---|
| 0 | 740.1 | 648.6 | 2238 | 16380 | 3409 | 12.97 | 23594 |
| Cycle 1 | 551.4 | 313.5 | 1878 | 7918 | 3118 | 10.36 | 10954 |
| Cycle 2 | 435.1 | 179.5 | 1625 | 4178 | 2965 | 8.64 | 5026 |
| Cycle 3 | 362.8 | 113.3 | 1425 | 2429 | 2763 | 7.4 | 2545 |
| Cycle 4 | 316.4 | 90.43 | 1254 | 1560 | 2537 | 6.46 | 1385 |
| Cycle 5 | 305.1 | 70.09 | 1206 | 1195 | 2488 | 6.28 | 677 |
| Cycle 6 | 244.5 | 55.11 | 958.8 | 842.2 | 1994 | 5.09 | 241 |

The results in Table 6 show that the weight ratio between the $Mg^{2+}$ concentration and the $Cl^-$ concentration in the brine dropped to ~0.25 (w/w) after six dilution cycles, e.g. when 10 mg/l of $Mg^{2+}$ are added to the soft water only 2.5 mg/l of $Cl^-$ are added.

EXAMPLE 3

Reduction of the Cl⁻ Concentration in the Product Solution Using NF-DiaNF Process with NP030 Membrane The NF-DiaNF process depicted in FIG. 9, was applied to achieve chloride minimization (i.e., reduce the $TH/SO_4^{2-}$ ratio), using a Nadir NP030 membrane. The feed was seawater (SW) or seawater brine (SWRO). The pressure applied in the experiment was 20 bar. A high pressure vessel was placed on a magnetic stirrer and high stirring speed was maintained throughout the experiment.

Table 7 shows results of an experiments in which the NP030 membrane was fed with SW and with SWRO brine at a pressure of 40 bar. Table 7 shows the average species concentrations developing in the retentate as a function of the applied recovery ratio. It can be seen that a ratio range of 1.48-1.55 (M/M) was attained between total hardness and $SO_4^{2-}$ at 75% recovery while at 90% recovery a ratio of 1.25-1.30 was attained (for both SW and SWRO brine).

Figure 11:
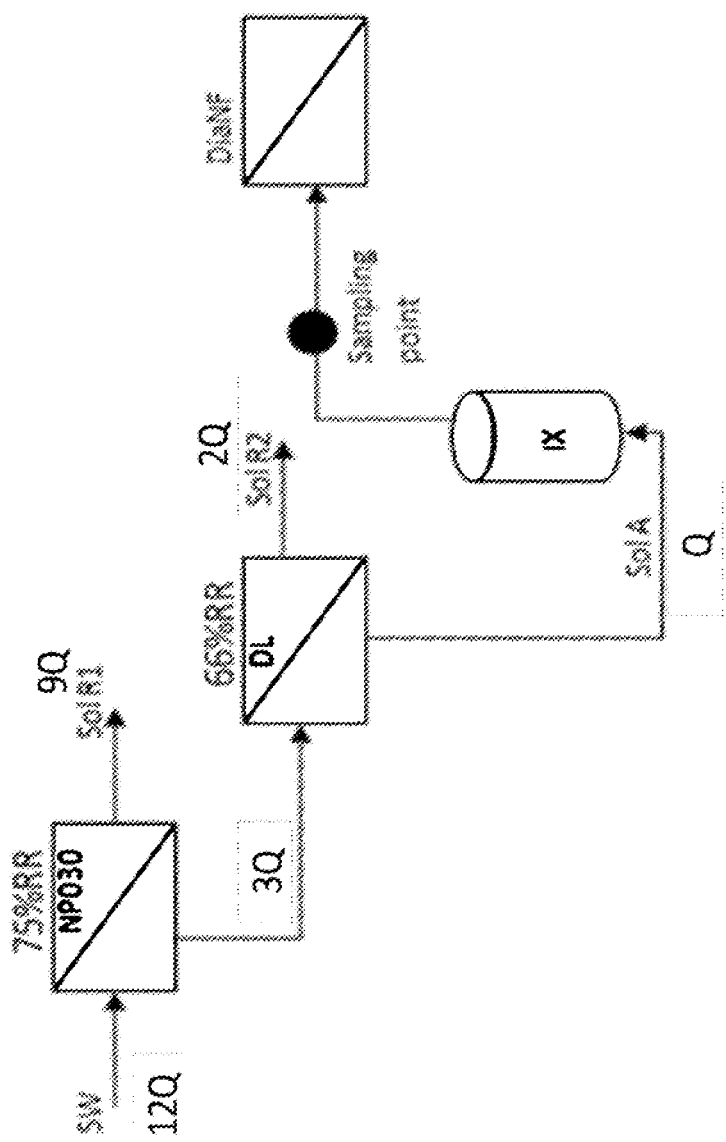
FIG. 11. Schematic of a method for achieving a ~1:1 ratio between TH and $SO_4^{2-}$:applying nanofiltration with an open NF membrane, followed by NF with DL to elevate the concentrations of ions in the brine, which is then softened using cation exchanger (IX).

Table 7 shows that the rejection of the NP030 membrane towards sulfate is low but apparent, while the rejection towards $Ca^{2+}$ and $Mg^{2+}$ is very low and the rejection for monovalent ions is negligible. It can also be seen that the SI of gypsum (and also of $CaCO_3$, which is not shown) was at all times negative and therefore the addition of AS or strong acid during this filtration step was not required. As discussed above, such low TH to $SO_4^{2-}$ ratios were hypothesized to be beneficial to the process since they were projected to allow minimizing the $Cl^-$ to $Mg^{2+}$ concentration ratio in the product solution (i.e. following the DiaNF step). Table 7 also shows that the TH to $SO_4^{2-}$ ratio was reduced from about 2.0-2.1 in SW and SWRO respectively, to about 1.25 (M/M), thus demonstrating the success of this approach. Using other NF membrane (e.g. the GH and GE series of UF membranes manufactured by GE Water & Power) can reduce the TH to $SO_4^{2-}$ ratio even further.

option is considered, as demonstrated in FIG. 11, using NP030 fed with seawater and applying a 75% recovery ratio, therefore reaching a TH to $SO_4^{2-}$ ratio of ~1.5:1 (see Table 7). Further reduction of the ratio is attained by softening the brine (after it undergoes concentration elevation using a second NF membrane (DL) and prior to the diaNF step), using a cation exchange resin (IX).

In other embodiments, the process depicted in FIG. 11 can be varied to carry out the cation exchange step between the two NF steps. Other variations are possible as apparent to a person of skill in the art.

Figure 12A:
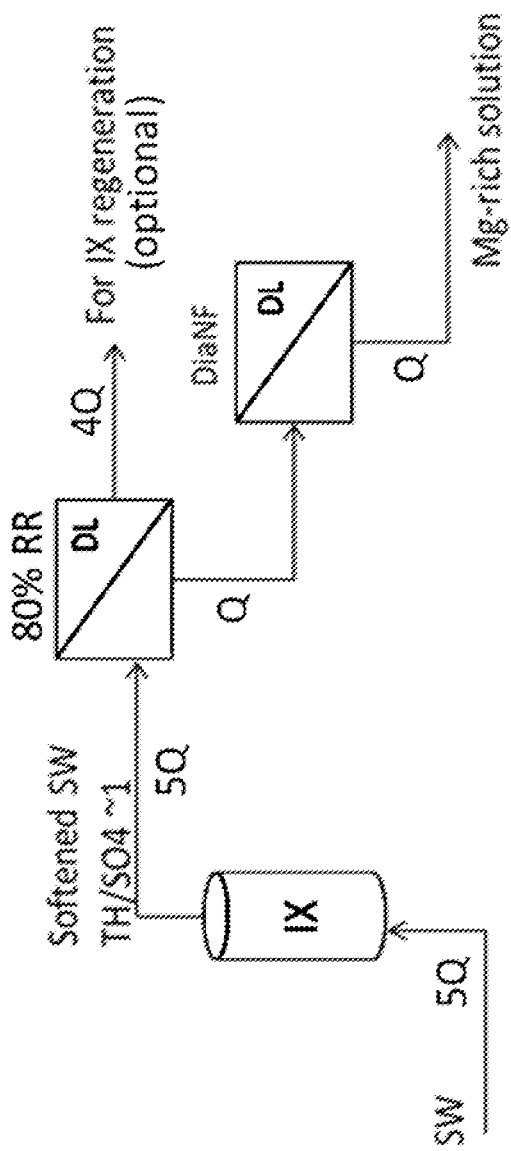
FIGS. 12A-12B. Schematic of a method for achieving a ~1:1 ratio between TH and $SO_4^{2-}$:softening seawater using ion exchanger. Regeneration is achieved using two NF permeates, the permeate of the NF step applied on the softened water (FIG. 12A) and the permeate of NF step applied on SWRO brine (FIG. 12B).
Figure 12B:
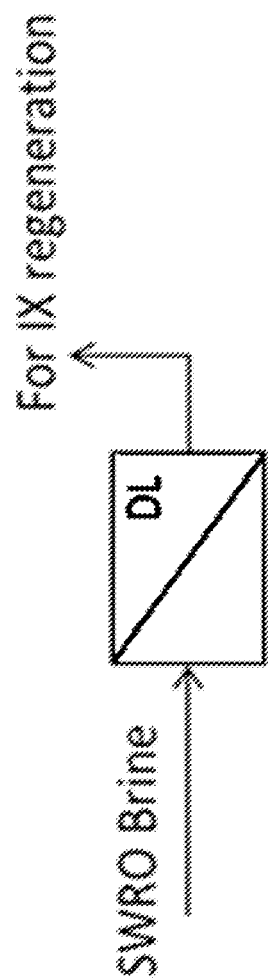

2. A process based on softening seawater using cationic IX resin and NF-DiaNF steps using DL membrane. The process, shown in FIGS. 12A-12B, is based on using cation IX resin to soften seawater, to result in a 1.05:1 TH to $SO_4^{2-}$ ratio, followed by NF-DiaNF step. The IX resin is regenerated with two $Na^+$-rich solutions: the permeate of the NF

TABLE 7

Results from passing seawater and SWRO brine through the NP030 membrane at 40 bar pressure (n = 4)

| RR | B mg/l | $Ca^{2+}$ mg/l | $K^+$ mg/l | $Mg^{2+}$ mg/l | $Na^+$ mg/l | $SO_4^{2-}$ mgS/l | $Sr^{2+}$ mg/l | $Cl^-$ mg/l | SI of Gypsum | $Cl^-/Mg^{2+}$ (g/g) | $Na^+/Mg^{2+}$ (g/g) | TH/$SO_4^{2-}$ (M/M) |
|---|---|---|---|---|---|---|---|---|---|---|---|---|
| SW Feed | 5.5 ± 0.5 | 508 ± 8 | 481 ± 10 | 1464 ± 15 | 12423 ± 115 | 1171 ± 30 | 8.3 ± 0.0 | 22976 ± 68 | −0.49 ± 0.00 | 15.7 ± 0.14 | 8.5 ± 0.16 | 2.00 ± 0.07 |
| 60% | 5.5 ± 0.3 | 529 ± 5 | 505 ± 11 | 1536 ± 13 | 13025 ± 99 | 1510 ± 42 | 8.9 ± 0.0 | 23766 ± 117 | −0.39 ± 0.00 | 15.5 ± 0.14 | 8.5 ± 0.13 | 1.62 ± 0.06 |
| 75% | 5.5 ± 0.2 | 553 ± 6 | 522 ± 8 | 1593 ± 19 | 13433 ± 106 | 1722 ± 46 | 9.3 ± 0.0 | 23903 ± 46 | −0.34 ± 0.01 | 15.0 ± 0.20 | 8.4 ± 0.14 | 1.48 ± 0.05 |
| 80% | 5.5 ± 0.2 | 584 ± 40 | 533 ± 6 | 1597 ± 25 | 13639 ± 85 | 1826 ± 40 | 9.4 ± 0.1 | 24046 ± 55 | −0.30 ± 0.02 | 15.1 ± 0.26 | 8.5 ± 0.13 | 1.41 ± 0.04 |
| 90% | 5.6 ± 0.1 | 626 ± 53 | 546 ± 13 | 1686 ± 21 | 14091 ± 170 | 2151 ± 139 | 10.0 ± 0.3 | 24030 ± 80 | −0.22 ± 0.05 | 14.3 ± 0.14 | 8.4 ± 0.12 | 1.27 ± 0.07 |
| SWRO feed | 9.2 ± 0.9 | 1001 ± 83 | 910 ± 8 | 2844 ± 31 | 23686 ± 391 | 2166 ± 100 | 15.8 ± 0.1 | 43687 ± 266 | −0.15 ± 0.03 | 15.4 ± 0.21 | 8.3 ± 0.19 | 2.10 ± 0.10 |
| 60% | 9.4 ± 0.6 | 1105 ± 64 | 958 ± 4 | 3184 ± 24 | 25060 ± 422 | 2971 ± 110 | 18.0 ± 0.1 | 44529 ± 220 | −0.01 ± 0.02 | 14.0 ± 0.11 | 7.9 ± 0.1 | 1.71 ± 0.07 |
| 75% | 8.7 ± 0.5 | 1119 ± 27 | 976 ± 10 | 3378 ± 52 | 25750 ± 549 | 3459 ± 107 | 19.3 ± 0.1 | 45695 ± 317 | 0.05 ± 0.01 | 13.5 ± 0.18 | 7.6 ± 0.06 | 1.55 ± 0.06 |
| 80% | 9.1[a] | 1141 ± 14 | 997 ± 6 | 3514 ± 47 | 25850 ± 134 | 3910 ± 73 | 20.9[a] | 46187 ± 153 | 0.09 ± 0.01 | 13.1 ± 0.21 | 7.4 ± 0.08 | 1.42 ± 0.01 |
| 90% | 9.1[a] | 1205 ± 59 | 1042 ± 9 | 3871 ± 48 | 27043 ± 238 | 4836 ± 95 | 27.4[a] | 47498 ± 204 | 0.17 ± 0.02 | 12.3 ± 0.18 | 7.0 ± 0.03 | 1.25 ± 0.01 |

[a]calculated based on the known rejection towards the particular ion

Thus, as contemplated herein, improving the rejection towards sulfate while retaining the low rejection towards divalent cations (e.g. by increasing the density of the negatively charged functional groups on the surface of the membrane) has the potential to both improve the final product quality and considerably reduce process costs.

EXAMPLE 4

Alternative Methods of Reducing the $Cl^-$ Concentration

Three additional embodiments of reducing $Cl^-$ in product water by adjusting $Ca^{2+}$ and $Mg^{2+}$ to $SO_4^{2-}$ ratio according to various embodiments of the present invention, are presented below:

1. In the process described in Example 3, a relatively open negatively charged NF membrane (i.e. NP030), used to produce brine with elevated $SO_4^{2-}$ concentration. The results (Table 7) show that in order to reach a 1.3:1 TH to $SO_4^{2-}$ ratio using this membrane, a 90% recovery ratio should be reached while applying 40 bar. In order to optimize this process further and reduce costs, another step applied on the softened water (shown in FIG. 12A) and the permeate of NF step applied on SWRO brine (shown in FIG. 12B). This NF step is designated for producing an IX regeneration solution.

Figure 13A:
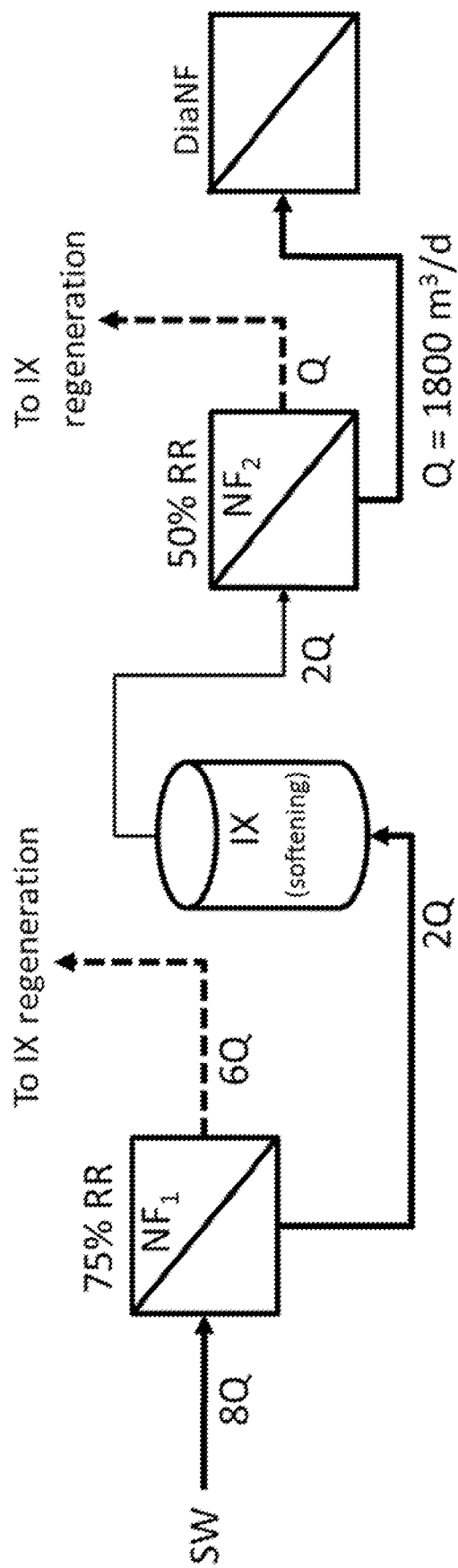
FIGS. 13A-13B. Schematic of a method for achieving a ~1:1 ratio between TH and $SO_4^{2-}$:applying nanofiltration with DL, followed by IX softener applied on the brine of the DL step. Thereafter, another NF step is applied followed by DiaNF step (FIG. 13A). The IX is regenerated using three streams: the permeate streams of the two NF steps, and a permeate produced solely for the purpose of regenerating the IX (FIG. 13B).
Figure 13B:
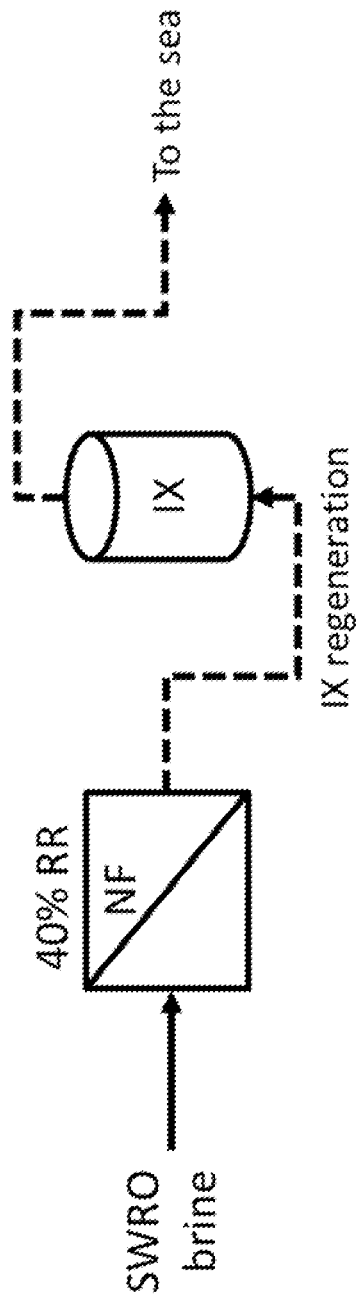

3. A process based on NF step, followed by IX, another NF and then DiaNF, is depicted in FIGS. 13A-13B. All the NF steps are conducted with DL membrane. The aim of the first NF step (applied on seawater) is to produce a brine with elevated concentrations of divalent ions (relative to seawater). In addition, the TH to $Na^+$ concentration ratio is also elevated in this brine, making it more suitable for softening using IX. At the end of the IX step the softened brine is characterized by a 1.05:1 TH to $SO_4^{2-}$ ratio. The softened brine then undergoes another NF step, to further elevate the $Mg^{2+}$ concentration. Finally, the $Mg^{2+}$ solution with the 1.05:1 TH to $SO_4^{2-}$ ratio is introduced into the DiaNF step.

In this process, the IX resin is regenerated with three $Na^+$-rich solutions: two streams inherent to the process, i.e. two permeate streams of the NF steps (applied on seawater and on the softened brine (shown in FIG. 13A); additionally, a permeate of NF step applied on SWRO brine is produced (shown in FIG. 13B). This NF step is designated for producing an IX regeneration solution.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

REFERENCES

[1] L. Birnhack, O. Nir, O. Lahav, Establishment of the Underlying Rationale and Description of a Cheap Nanofiltration-Based Method for Supplementing Desalinated Water with Magnesium Ions, Water. 6 (2014) 1172-1186. doi:10.3390/w6051172.

[2] U. Yermiyahu, A. Tal, A. Ben-Gal, A. Bar-Tal, J. Tarchitzky, O. Lahav, Environmental science. Rethinking desalinated water quality and agriculture, Science. 318 (2007) 920-1. doi:10.1126/science.1146339.

[3] J. Redondo, M. Busch, J.-P. De Witte, Boron removal from seawater using FILMTEC™ high rejection SWRO membranes, Desalination. 156 (2003) 229-238. doi: 10.1016/S0011-9164(03)00345-X.

[4] L. F. Greenlee, D. F. Lawler, B. D. Freeman, B. Marrot, P. Moulin, Reverse osmosis desalination: water sources, technology, and today's challenges, Water Res. 43 (2009) 2317-48. doi:10.1016/j.watres.2009.03.010.

[5] O. Lahav, L. Birnhack, Quality criteria for desalinated water following post-treatment, Desalination. 207 (2007) 286-303. doi:10.1016/j.desal.2006.05.022.

[6] D. Hasson, R. Semiat, H. Shemer, M. Priel, N. Nadav, Simple process for hardening desalinated water with $Mg^{2+}$ ions, Desalin. Water Treat. 51 (2013) 924-929. doi:10.1080/19443994.2012.707375.

[7] L. Birnhack, N. Fridman, O. Lahav, Potential applications of quarry dolomite for post treatment of desalinated water, Desalin. Water Treat. 1 (2012) 58-67. doi:10.5004/dwt.2009.132.

[8] L. Birnhack, R. Penn, S. Oren, O. Lehmann, O. Lahav, Pilot scale evaluation of a novel post-treatment process for desalinated water, Desalin. Water Treat. 13 (2012) 128-136. doi:10.5004/dwt.2010.984.

[9] L. Birnhack, O. Lahav, A new post-treatment process for attaining $Ca^{2+}$, $Mg^{2+}$, $SO_4^{2-}$ and alkalinity criteria in desalinated water, Water Res. 41 (2007) 3989-97. doi: 10.1016/j.watres.2007.06.007.

[10] L. Birnhack, S. Oren, O. Lehmann, O. Lahav, Development of an additional step to current $CO_2$-based $CaCO_{3(s)}$ dissolution post-treatment processes for cost-effective $Mg^{2+}$ supply to desalinated water, Chem. Eng. J. 160 (2010) 48-56. doi:10.1016/j.cej.2010.03.002.

[11] O. Lehmann, O. Nir, M. Kuflik, O. Lahav, Recovery of high-purity magnesium solutions from RO brines by adsorption of $Mg(OH)_{2(s)}$ on $Fe_3O_4$ micro-particles and magnetic solids separation, Chem. Eng. J. 235 (2014) 37-45. doi:10.1016/j.cej.2013.09.014.

[12] O. Lehmann, O. Eckhaus, O. Lahav, L. Birnhack, Replenishing Mg(II) to desalinated water by seawater nanofiltration followed by magnetic separation of $Mg(OH)_{2(s)\ Fe3O4}$ particles, Desalin. Water Treat. (2015) 1-14. doi:10.1080/19443994.2015.1107858.

[13] A. I. Schäfer, A. G. Fane, Nanofiltration: principles and applications, 1st ed., Oxford [etc.]: Elsevier, 2005.

[14] L. Ophek, L. Birnhack, O. Nir, E. Binshtein, O. Lahav, Reducing the specific energy consumption of 1st-pass SWRO by application of high-flux membranes fed with high-pH, decarbonated seawater, Water Res. 85 (2015) 185-92. doi:10.1016/j.watres.2015.08.027.

[15] APHA, Standard Methods for the Examination of Water and Wastewater, 20th ed., American Public Health Association, American Water Works Association and Water Environmental Federation, Washington, D.C., 1998.

What is claimed is:

1. A process for treating saline water to obtain product water comprising a higher concentration of divalent ions selected from $Mg^{2+}$, $Ca^{2+}$ and $SO_4^{2-}$ as compared with said saline water, the process comprising the steps of:
   a. passing a sample of saline water through a first nanofiltration (NF) membrane to obtain an NF permeate and an NF retentate (NF brine);
   b. performing a first diaNanofiltration (DiaNF) cycle comprising: passing the NF brine obtained in step (a) through a second NF membrane in the presence of a diluting solution to obtain a DiaNF permeate and a DiaNF retentate (DiaNF brine), wherein the volume of the diluting solution is equal to the NF brine obtained from step (a) and is added at a flow rate substantially equal to that of the DiaNF permeate; and
   c. isolating the DiaNF brine from step (b) as product water having a higher concentration of said divalent ions, and a lower concentration of species selected from $Na^+$, $Br^-$, $Cl^-$ and B as compared with said saline water, wherein the process further comprises the step of lowering the $Mg^{2+}+Ca^{2+}:SO_4^{2-}$ concentration ratio in the product water as compared with the saline water.

2. The process according to claim 1, further comprising the step of passing the product water through at least one ultrafiltration (UF) membrane.

3. The process according to claim 1, further comprising the step of de-carbonating the saline water prior to the NF of step (a).

4. The process according to claim 1, wherein:
   a. the saline water is selected from the group consisting of sea water, brackish water and seawater reverse osmosis (SWRO) brine; or
   b. wherein the diluting solution is selected from the group consisting of low total dissolved solids (TDS) water, soft water, distilled water, tap water, NF permeate, SWRO permeate, and brine obtained after multiple SWRO stages.

5. The process according to claim 1, wherein the recovery ratio (RR) of the NF in step (a) is between 40 and 85%.

6. The process according to claim 1, wherein an anti-scalant is added to the saline water.

7. The process according to claim 1, comprising between 1 and 6 DiaNF cycles, wherein the permeate of the last DiaNF cycle(s) for a given batch of saline water is recycled and used as the diluting solution of the first DiaNF cycle(s) of the next batch of saline water.

8. The process according to claim 1, comprising between 1 and 6 DiaNF cycles, wherein a. the diluting solution of the last DiaNF cycle(s) is seawater reverse osmosis (SWRO) permeate, distilled water or fresh water; or b. the diluting solution of the first DiaNF cycle(s) is brine obtained after multiple SWRO stages.

9. The process according to claim 1, wherein the first nanofiltration (NF) membrane and the second NF membrane are the same or different.

10. The process according to claim 1, wherein the first and/or second NF membranes preferentially reject $Ca^{2+}$ and/or $Mg^{2+}$ ions over $Na^+$, $Br^-$, $Cl^-$ and B species.

11. The process according to claim 1, wherein the permeates from the NF of step (a) and one or more DiaNF cycles are combined and recycled back to a desalination plant.

12. The process according to claim 1, further comprising the step of performing at least one additional NF step prior to the DiaNF in step (b).

13. The process according to claim 1, wherein the $Mg^{2+}+Ca^{2+}:SO_4^{2-}$ concentration ratio is lowered by:
   a. reducing the $Mg^{2+}$ and $Ca^{2+}$ concentrations in the product water by performing a cation exchange step on the saline water prior to the NF in step (a), between two NF cycles in step (a), or between the NF of step (a) and the first DiaNF cycle; or
   b. increasing the $SO_4^{2-}$ concentration in the product water; wherein the $SO_4^{2-}$ concentration is increased by:
      i. employing a membrane which preferentially rejects $SO_4^{2-}$ over $Mg^{2+}$ and $Ca^{2+}$, prior to NF of step (a), or as part of the NF in step (a);
      ii. adding a $SO_4^{2-}$ source to a feed of the DiaNF of step (b); or
      iii. performing an anion exchange step.

14. The process according to claim 1, wherein the $Mg^{2+}+Ca^{2+}:SO_4^{2-}$ ratio in the saline water is about 2:1, and is lowered to between about 1.25:1 and about 1:1 in the product water.

15. The process according to claim 1, which results in the reduction or elimination of $Cl^-$ ions in the product water.

16. The process according to claim 1, wherein:
   a. the $Cl^-$ to $Mg^{2+}$ concentration ratio is at least about 10:1 (w/w) in the saline water, and lower than about 5:1 (w/w) in the product water; or
   b. the $Na^+$ to $Mg^{2+}$ concentration ratio is at least about 5:1 (w/w) in the saline water, and about 1:1 (w/w) or lower in the product water.

17. The process according to claim 1, wherein the NF of step (a) is preceded by one or more DiaNF dilution cycles.

18. The process according to claim 1, further comprising the step of adding the thus obtained product water to a water sample so as to supplement said water sample with $Mg^{2+}$, $Ca^{2+}$, and/or $SO_4^{2-}$.

19. A process for treating saline water to obtain product water comprising a higher concentration of divalent ions selected from $Mg^{2+}$, $Ca^{2+}$ and $SO_4^{2-}$ as compared with said saline water, the process comprising the steps of:
   a. passing a sample of saline water through a first nanofiltration (NF) membrane to obtain an NF permeate and an NF retentate (NF brine);
   b. performing a first diaNanofiltration (DiaNF) cycle comprising: passing the NF brine obtained in step (a) through a second NF membrane in the presence of a diluting solution to obtain a DiaNF permeate and a DiaNF retentate (DiaNF brine), wherein the volume of the diluting solution is equal to the NF brine obtained from step (a) and is added at a flow rate substantially equal to that of the DiaNF permeate;
   c. subjecting the DiaNF brine obtained in step (b) to one or more additional DiaNF cycles in the presence of a diluting solution; and
   d. isolating the DiaNF brine from step (c) as product water having a higher concentration of said divalent ions, and a lower concentration of species selected from $Na^+$, $Br^-$, $Cl^-$ and B as compared with said saline water, wherein the process further comprises the step of lowering the $Mg^{2+}+Ca^{2+}:SO_4^{2-}$ concentration ratio in the product water as compared with the saline water.

* * * * *